(12) United States Patent
Stamatakis

(10) Patent No.: US 11,197,146 B2
(45) Date of Patent: Dec. 7, 2021

(54) SYSTEM, METHOD AND APPARATUS FOR NODE SELECTION OF A SENSOR NETWORK

(71) Applicant: Senseware, Inc., Vienna, VA (US)

(72) Inventor: Julien G. Stamatakis, Centreville, VA (US)

(73) Assignee: Senseware, Inc., Vienna, VA (US)

( * ) Notice: Subject to any disclaimer, the term of this patent is extended or adjusted under 35 U.S.C. 154(b) by 0 days.

(21) Appl. No.: 16/739,619

(22) Filed: Jan. 10, 2020

(65) Prior Publication Data

US 2020/0267528 A1 Aug. 20, 2020

Related U.S. Application Data

(63) Continuation of application No. 15/989,829, filed on May 25, 2018, now Pat. No. 10,536,838, which is a continuation of application No. 15/064,667, filed on Mar. 9, 2016, now Pat. No. 9,986,411.

(51) Int. Cl.
| | |
|---|---|
| *H04W 8/00* | (2009.01) |
| *H04L 12/24* | (2006.01) |
| *H04L 12/733* | (2013.01) |
| *H04W 40/24* | (2009.01) |
| *H04W 40/22* | (2009.01) |
| *H04W 40/10* | (2009.01) |
| *H04W 28/02* | (2009.01) |
| *H04W 84/18* | (2009.01) |
| *H04W 4/80* | (2018.01) |
| *H04W 4/38* | (2018.01) |

(52) U.S. Cl.
CPC ............ *H04W 8/005* (2013.01); *H04L 41/12* (2013.01); *H04L 45/122* (2013.01); *H04W 28/021* (2013.01); *H04W 40/10* (2013.01); *H04W 40/22* (2013.01); *H04W 40/244* (2013.01); *H04W 40/246* (2013.01); *H04W 40/248* (2013.01); *H04W 4/38* (2018.02); *H04W 4/80* (2018.02); *H04W 84/18* (2013.01)

(58) Field of Classification Search
CPC ... H04W 8/005; H04W 40/246; H04W 40/22; H04W 40/248; H04W 28/021; H04W 41/12
See application file for complete search history.

(56) References Cited

U.S. PATENT DOCUMENTS

| | | | |
|---|---|---|---|
| 7,379,981 B2 | 5/2008 | Elliott et al. | |
| 8,103,389 B2 | 1/2012 | Golden et al. | |
| 8,451,807 B2* | 5/2013 | Yi | ............. H04W 40/20 370/338 |
| 9,534,929 B1 | 1/2017 | Stamatakis et al. | |
| 9,534,930 B1 | 1/2017 | Stamatakis | |
| 9,538,578 B1 | 1/2017 | Stamatakis et al. | |
| 9,551,594 B1 | 1/2017 | Stamatakis | |

(Continued)

OTHER PUBLICATIONS

Cloud Logger, 38 Zeros, 2015.

(Continued)

*Primary Examiner* — Min Jung

(57) ABSTRACT

A system, method and apparatus for node selection of a sensor network. Multiple sensor networks can operate in or around a monitored location. Nodes can be organized amongst the multiple sensor networks using remote configuration updates that are provided by a host system to a sensor network node.

20 Claims, 15 Drawing Sheets

(56) References Cited

U.S. PATENT DOCUMENTS

| | | |
|---|---|---|
| 9,554,236 B1 | 1/2017 | Stamatakis |
| 9,714,843 B1 | 7/2017 | Stamatakis et al. |
| 9,714,844 B1 | 7/2017 | Stamatakis et al. |
| 9,756,511 B1 | 9/2017 | Stamatakis et al. |
| 9,762,979 B1 | 9/2017 | Stamatakis et al. |
| 9,763,118 B1 | 9/2017 | Stamatakis et al. |
| 9,800,646 B1 | 10/2017 | Stamatakis et al. |
| 9,813,489 B1 | 11/2017 | Stamatakis et al. |
| 9,876,653 B1 | 1/2018 | Stamatakis |
| 9,888,336 B1 | 2/2018 | Stamatakis |
| 9,942,693 B2 | 4/2018 | Stamatakis |
| 9,986,411 B1 | 5/2018 | Stamatakis |
| 10,028,077 B2 | 7/2018 | Ben Schachar |
| 10,142,196 B1 | 11/2018 | Stamatakis et al. |
| 10,143,038 B1 | 11/2018 | Stamatakis |
| 10,149,141 B1 | 12/2018 | Stamatakis et al. |
| 10,171,891 B1 | 1/2019 | Stamatakis |
| 10,171,972 B2 | 1/2019 | Stamatakis et al. |
| 10,178,638 B1 | 1/2019 | Stamatakis et al. |
| 10,237,631 B2 | 3/2019 | Stamatakis et al. |
| 10,263,841 B1 | 4/2019 | Stamatakis et al. |
| 10,313,149 B2 | 6/2019 | Stamatakis |
| 10,313,197 B1 | 6/2019 | Stamatakis |
| 10,334,417 B2 | 6/2019 | Stamatakis et al. |
| 10,536,838 B2 | 1/2020 | Stamatakis |
| 10,542,331 B2 | 1/2020 | Stamatakis |
| 2007/0211681 A1 | 9/2007 | Sun et al. |
| 2008/0208367 A1 | 8/2008 | Koehler |
| 2009/0059843 A1 | 3/2009 | Binding |
| 2009/0141692 A1 | 6/2009 | Kasslin |
| 2009/0316628 A1 | 12/2009 | Enns |
| 2011/0044169 A1 | 2/2011 | Liu |
| 2012/0020298 A1 | 1/2012 | Shon |
| 2013/0294285 A1 | 11/2013 | Zhang |
| 2014/0176340 A1 | 6/2014 | Liang |
| 2014/0235244 A1 | 8/2014 | Hinman |
| 2014/0315544 A1 | 10/2014 | Yang |
| 2015/0230043 A1 | 8/2015 | Yakir |
| 2015/0316945 A1 | 11/2015 | Soya |
| 2016/0112518 A1 | 4/2016 | Haleem et al. |
| 2016/0359658 A1* | 12/2016 | Yadav ............... H04L 41/0816 |
| 2017/0006408 A1 | 1/2017 | Kim |
| 2017/0034316 A1 | 2/2017 | Pei |
| 2017/0181114 A1 | 6/2017 | Lu |
| 2017/0207956 A1* | 7/2017 | Cabral ............... H04L 41/082 |
| 2018/0262401 A1 | 9/2018 | Shah |

OTHER PUBLICATIONS

Smart Processing Starts at the Edge of the Network, B+B Smartworx, 2014.
Wireless Sensors and Output Devices, ConnectSense, 2015.
It's Time You Experienced Eclypse, Distech Controls, 2014.
Compact Sensor, Enlighted, 2015.
Energy Manager, Enlighted, 2015.
Gateway, Enlighted, 2015.
Enlighted Smart Sensor, 2015.
Manning, Lauren, "Wireless Infrastructure Provider Filament Closes $5m Series A, Shows Promise for Agtech Application," Aug. 21, 2015.
Intellastar, 2015.
Your Internet of Things, Monnit, 2014.
Monnit Industrial Wireless AC Current Meter, 2015.
$3^{rd}$ Generation Nest Learning Thermostat, 2015.
AcquiSuite+ Dtaa Acquisition Server, Obvius, LLC, Installation and Operation Manual, Model A8814, Jan. 11, 2014.
Application Note: ModHopper Makes Submetering Easy, Obvius, LLC, Mar. 29, 2012.
ModHopper—Wireless Modbus/Pulse Transceiver, Obvius, LLC, Installation and Operation, Model R9120 (Rev C), Dec. 11, 2012.
Atmel Corporation, 8-bit AVR Microcontroller with Low Power 2.4GHz Transceiver for ZigBee and IEEE 802.15.4, 2014.
Application Note, Atmel AT06482: Real Color ZLL LED Light Bulb with ATmega256RFR2—Software User's Guide, 2013.
Application Note, AT06412: Real Color ZLL LED Light Bulb with ATmega256RFR2—Hardware User Guide, 2014.
Exploring New Lighting Opportunities with ZigBee Light Link Webinar, May 16, 2012.
Point Six Wireless Wi-Fi Sensor Product Guide, 2015.
Eagle, Rainforest Automation, 2015.
Product Comparison Guide, SmartStruxture Lite solution and wireless devices for SmartStruxture solution, Schneider Electric, Mar. 12, 2015.
SmartStruxure Lite Solution, SEC Series, Smart Terminal Controller (SEC-TE), Schneider Electric, Aug. 1, 2013.
SmartStruxure Lite Solution, Schneider Electric, May 1, 2015.
SmartStruxure Lite Solution, Our open system approach to standards and protocols, Schneider Electric, Jul. 2, 2014.
Senseware, Mar. 25, 2014.
Product Data Sheet, SWS-DPC Wireless Pulse Counters, SpinWave Systems, Inc., 2007.
Product Data Sheet, SWC-TSTAT-3 Wireless Thermostat Controller, SpinWave Systems, Inc., 2012.
A3 Wireless Sensor Network, SpinWave Systems, Inc., 2007.
Veris Industries, 2015.
U.S. Appl. No. 62/025,640, entitled "Separation of Current Sensor and Voltage Sensor for True Power Measurement," filed Jul. 17, 2014.
Khamphanchai et al., Conceptual Architecture of Building Energy Management Open Source Software (BEMOSS), 5th IEEE PES Intelligent Smart Grid Technologies (ISGT) European Conference, Oct. 12-15, 2014.
DOLPHIN Core Description, EnOcean, Jul. 21, 2014.
Remote Management 2.0, EnOcean, Mar. 6, 2013.
EnOcean—The World of Energy Harvesting Wireless Technology, Feb. 2015.
Wireless Sensor Solutions for Home & Building Automation—The Successful Standard Uses Energy Harvesting, EnOcean, Aug. 10, 2007.
Metasys® System Product Bulletin, Code No. LIT-1201526, Release 7.0, Dec. 5, 2014.
Metasys® System Extended Architecture Wireless Network, Application Note, Oct. 24, 2006.
Metasys® System Field Equipment Controllers and Related Products, Product Bulletin, Code No. LIT-12011042, Software Release 5.0, Jun. 21, 2010.
ZFR1800 Series Wireless Field Bus System, Technical Bulletin, Code No. LIT-12011295, Software Release 10.1, Dec. 5, 2014.
Wireless Metasys® System Product Bulletin, Code No. LIT-12011244, Software Release 5.0, Jan. 4, 2010.
Environmental Index™—Balancing Efficiency with Comfort, Automated Logic Corporation, 2013.
Equipment Portal, Automated Logic Corporation, 2013.
EnergyReports™ Web Application—A Tool for Sustainable Building Operations, Automated Logic Corporation, 2013.
WebCTRL®—Powerful and Intuitive Front End for Building Control, Mar. 26, 2015.
ISelect Adds New Portfolio Company: Bractlet, 2015.
Know—Bractlet.
Analyze—Bractlet.
Ensure—Bractlet.
Announcing Samsara: Internet connected sensors, May 18, 2015.
Samsara—Internet Connected Sensors.
Samsara—Features.
Samsara—Models.
Samsara—API.
Press Release, Helium Makes Sense of the Internet of Things, Oct. 27, 2015.
Press Release, Helium Introduces Another Smart Sensor for Environmental Monitoring, Apr. 25, 2016.
Press Release, Helium Announces Helium Pulse Monitoring and Alerting Application, Apr. 25, 2016.
EE Times, IoT Startup Revises 802.15.4 Nets, Oct. 27, 2015.
Helium Pulse™ for Monitoring and Alerting, 2016.
Helium Green™ Environmental Smart Sensor, 2016.
Helium Blue™ Temperature & Door Smart Sensor, 2016.

\* cited by examiner

SYSTEM, METHOD AND APPARATUS FOR NODE SELECTION OF A SENSOR NETWORK

This application is a continuation of non-provisional application Ser. No. 15/989,829, filed May 25, 2018, which is a continuation of non-provisional application Ser. No. 15/064,667, filed Mar. 9, 2016.

BACKGROUND

Field

The present disclosure relates generally to sensor applications, including a system, method and apparatus for node selection of a sensor network.

Introduction

Sensors can be used to monitor physical environment conditions. Wireless sensor networks can be used to collect data from distributed sensors and to route the collected sensor data to a central location.

BRIEF DESCRIPTION OF THE DRAWINGS

In order to describe the manner in which the above-recited and other advantages and features can be obtained, a more particular description will be rendered by reference to specific embodiments thereof which are illustrated in the appended drawings. Understanding that these drawings depict only typical embodiments and are not therefore to be considered limiting of its scope, the disclosure describes and explains with additional specificity and detail through the use of the accompanying drawings in which.

DETAILED DESCRIPTION

Various embodiments are discussed in detail below. While specific implementations are discussed, it should be understood that this is done for illustration purposes only. A person skilled in the relevant art will recognize that other components and configurations may be used without parting from the spirit and scope of the present disclosure.

Sensors provide a mechanism for discovering and analyzing a physical environment at a monitored location. In general, a monitored location can represent any area where one or more sensors are deployed. The monitored location may or may not represent a physical area having clearly defined boundaries. As would be appreciated, the extent of the sensor application itself provides a sense of boundary to the monitored location. In one example, the monitored location can represent a building such as a home, hotel, industrial facility, school, hospital, community building, stadium, airport, convention center, warehouse, office building, store, restaurant, mall, shopping center, data center, multi-dwelling unit, or other defined building structure. In another example, the monitored location can represent an area of control such as a vehicle or container in any mode of transport, a service area, an entertainment area, an asset collection area, a construction zone, or any monitored area that can be fixed or movable. In yet another example, the monitored location can represent an area proximate to an article, device, person or other item of interest upon which one or more sensors are attached.

Figure 1:
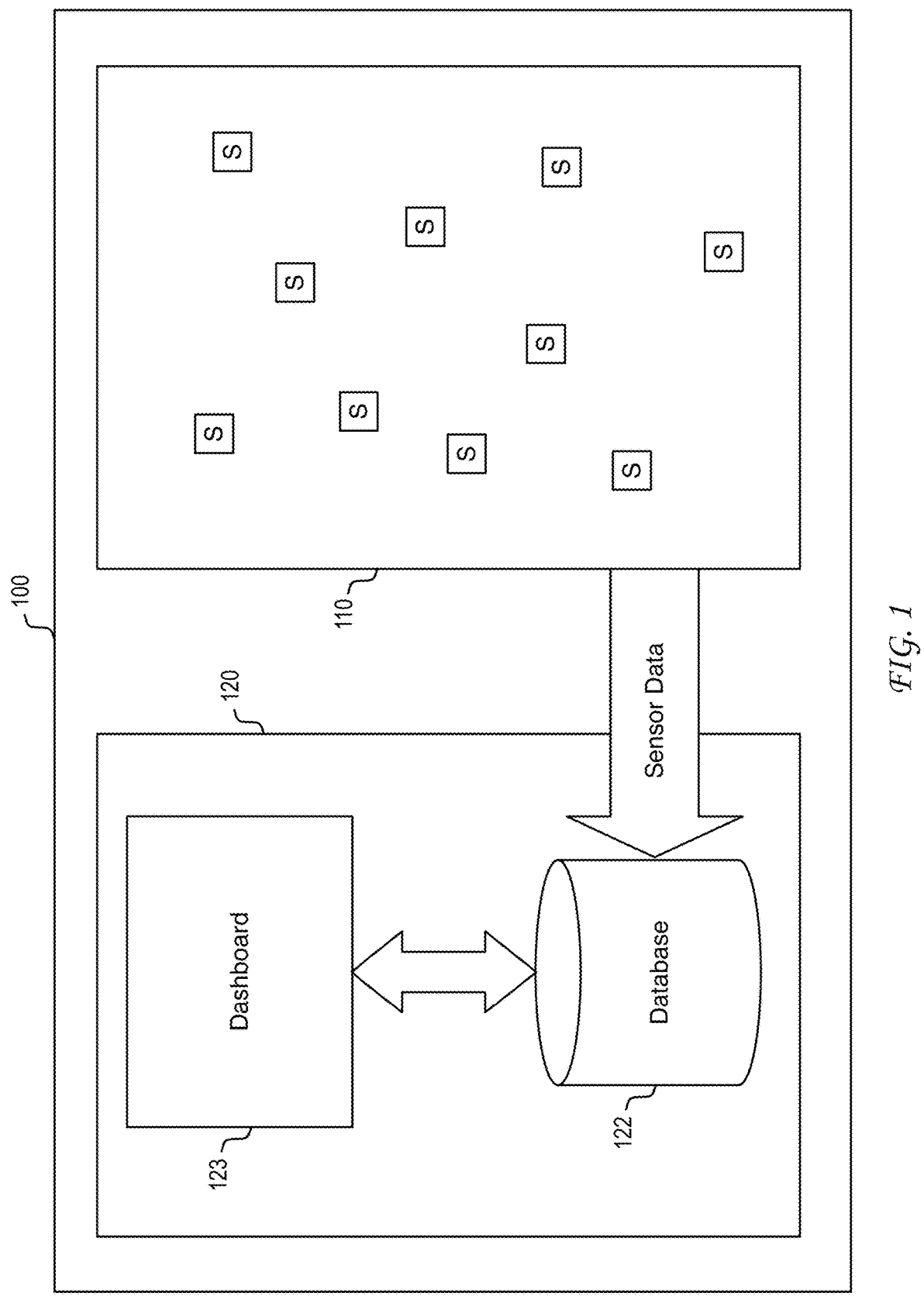
FIG. 1 illustrates an example of a sensor data management system.

FIG. 1 illustrates an example of the collection and analysis of data from sensors installed at a monitored location. As illustrated, sensor data management system 100 collects sensor data from a plurality of sensors installed at monitored location 110. This collection portion of sensor data management system 100 provides sensor data to control and analysis portion 120. Control and analysis portion 120 includes database 122 for storage of the collected sensor data. Dashboard 123 can be embodied as an online platform that allows a customer to view the sensor data from monitored location 110. Dashboard 123 can therefore represent a management tool authored by sensor data management system 100 that helps promote visualization and customer understanding of the sensor data.

The deployment of individual sensors at a monitored location is part of the growing trend of the Internet of Things (IoT). The connectivity of the individual sensors through a wireless sensor network enables inclusion of those sensors as part of an open network. A sensors as a service model (SaaS) promotes the open usage of the sensors and the data collected by them to any party having an interest in at least part of the monitored location.

Figure 2:
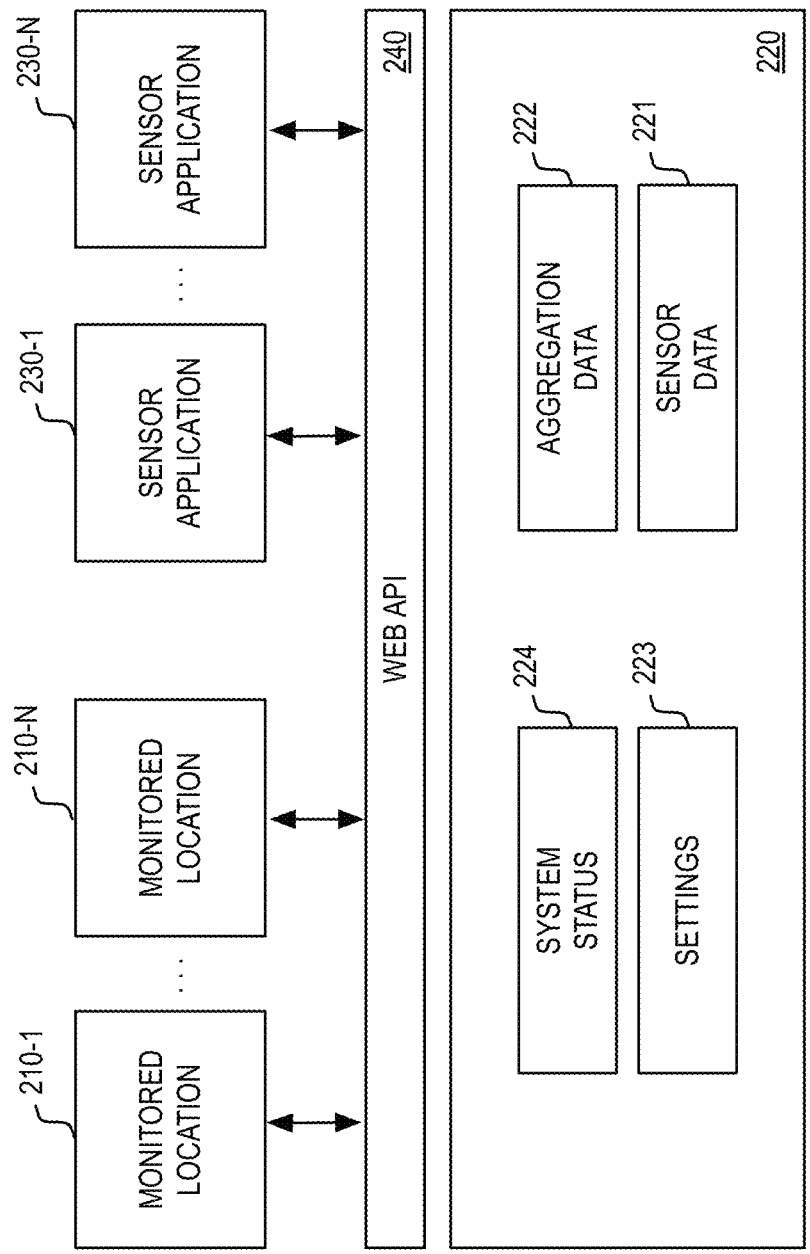
FIG. 2 illustrates an example framework that enables discrete sensor application development in a sensors as a service model.

FIG. 2 illustrates an example framework that enables discrete sensor application development in a SaaS model. Central to this SaaS model is host system 220. In general, one or more servers in host system 220 can be configured to facilitate the various processes that enable a collection of sensor data from the plurality of monitored locations 210-$n$, processing and storage of sensor data in a database, and a distribution of sensor data to a plurality of sensor applications 230-$n$. The plurality of monitored locations 210-$n$ and the plurality of sensor applications 230-$n$ can interface with host system 220 via web application programming interface (API) 240. In one embodiment, web API 240 would be based on HTTP methods such as GET, PUT, POST, and DELETE.

As illustrated, host system 220 can collect sensor data from the plurality of monitored locations 210-$n$ via web API 240. For example, host system 220 can receive the latest sensor readings using HTTP POST methods from the plurality of monitored locations 210-$n$. Via web API 240, host system 220 can collect a first set of sensor data from a first plurality of sensors installed at a first monitored location, collect a second set of sensor data from a second plurality of sensors installed at a second monitored location, . . . and collect an $N^{th}$ set of sensor data from an $N^{th}$ plurality of sensors installed at an $N^{th}$ monitored location. The N collected sets of sensor data can be stored in a database as sensor data 221. In one embodiment, aggregation data 222 can also be generated by host system 220 based on sensor data 221. In general, aggregation data 222 can represent any processed form of sensor data 221.

In one application, a sensor data value can be transformed via a defined conversion relationship into a single aggregation data value. For example, a number of detected pulses can be transformed using a defined conversion relationship into a measure of consumption (e.g., power). In another application, a plurality of sensor data values can be processed through a defined conversion relationship into a single aggregation data value. For example, a plurality of sensor data values can be analyzed to determine whether an alert should be triggered. In another example, a plurality of sensor data values such as voltage and current can be processed to produce a measure of power. In yet another scenario, a plurality of sensor data values can be grouped together into an aggregation of data values. For example, a plurality of sensor data values can be grouped together to produce a customer report.

Sensor data 221 and/or aggregation data 222 are accessible by a plurality of sensor applications 230-$n$ via web API 240. More specifically, host system 220 can provide a first set of sensor data 221 and/or aggregation data 222 upon request by a first sensor application, provide a second set of sensor data 221 and/or aggregation data 222 upon request by a second sensor application, . . . and provide an $N^{th}$ set of sensor data 221 and/or aggregation data 222 upon request by an $N^{th}$ sensor application. Each of the distributed sets of sensor data 221 and/or aggregation data 222 can support the respective needs of the requesting sensor application 230-$n$. The respective needs can relate to all or part of one or more monitored locations 210-$n$. The scope of a sensor application 230-$n$ in meeting a particular customer need would dictate the amount of sensor data 221 and/or aggregation data 222 that is provided.

In one scenario, the set of sensor data 221 and/or aggregation data 222 can relate to a specific set of sensors in a part of a monitored location 210-$n$ occupied by a building tenant. In another scenario, the set of sensor data 221 and/or aggregation data 222 can relate to a particular type of sensor (e.g., power) in one or more monitored locations 210-$n$. In yet another scenario, the set of sensor data 221 and/or aggregation data 222 can relate to a subset of sensors in a particular monitored location 210-$n$ over a specified time period (e.g., day, week, month, or other defined period of time) to perform an audit of conditions of the physical environment at that monitored location 210-$n$. Here, it should also be noted, that the set of sensor data 221 and/or aggregation data 222 provided to a first sensor application can overlap in part with the set of sensor data 221 and/or aggregation data 222 provided to a second sensor application.

As would be appreciated, a distributed set of sensor data 221 and/or aggregation data 222 can be customized to the needs of a particular sensor application 230-$n$. In that way, the systematic collection, processing and storage of sensor data by host system 220 can be viewed as a sensor service from the perspective of sensor applications 230-$n$. Significantly, any sensor application 230-$n$ can request data associated with any sensor at any monitored location 210-$n$ over any time period via web API 240. New sensor applications can continually be developed for analysis of sensor data 221 and/or aggregation data 222, thereby increasingly leveraging sensor data 221 and aggregation data 222. Host system 220 can therefore be positioned as a sensor data service platform upon which front-end sensor applications 230-$n$ can be built.

In implementing a full-featured sensor service, host system 220 can also enable sensor applications 230-$n$ to customize the collection and processing of sensor data. This customization increases the adaptability and flexibility of the sensor service in meeting the needs of the sensor applications 230-$n$. In one embodiment, sensor applications 230-$n$ can customize the operation of the sensor service using web API 240. These customizations can be stored in a database as settings 223.

In one example, a sensor application 230-$n$ can specify a conversion function via web API 240 for application to one or more values of sensor data. The conversion function can be stored in the database as settings 223 and applied to one or more values of sensor data 221 to produce one or more values of aggregation data 222. In this manner, a sensor application 230-$n$ can specify one or more conversion functions that are configured to prepare a set of inputs for use by the sensor application 230-$n$. One advantage of the specification of such conversion functions is that the sensor application 230-$n$ is assured of receiving data of a known type, of a known quantity, of a known accuracy, of a known format, or of any other expected characteristic for processing by the sensor application 230-$n$. In one scenario, this can be used to ensure that sensor application 230-$n$ can be easily repurposed from another sensor application environment to the particular sensor service supported by host system 220.

In general, the conversion functions can be used to create standardized outputs from data generated by different types of sensors. Another advantage of the specification of such conversion functions is that the sensor application 230-$n$ can be designed to operate at a specified level of complexity relative to host system 220. In one scenario, a sensor application 230-$n$ can offload analysis functions to host system 220, thereby enabling the sensor application 230-$n$ to perform simple functions (e.g., alerts) on received aggregation data 222. This scenario would be useful in allowing sensor application 230-$n$ to be implemented as a lightweight sensor application 230-$n$ for download and installation on a mobile computing device. This would be in contrast to a full-featured sensor application 230-$n$ that is intended for installation on a server device and which is designed for heavy-duty processing and analysis functions. As would be appreciated, conversion functions can be used to facilitate a customized interaction between a sensor application 230-$n$ and host system 220.

In another example, a sensor application 230-$n$ can specify destinations for the distribution of sensor data 221 and/or aggregation data 222. For example, a sensor application 230-$n$ can specify that separate subsets of sensor data 221 and/or aggregation data 222 are distributed to different destinations. In this framework, the separate subsets of sensor data 221 and/or aggregation data 222 may or may not correspond to distinct physical parts of a monitored location.

More generally, each subset of sensor data 221 and/or aggregation data 222 can relate to a separate interest by a sensor application 230-n to sensor data 221 and/or aggregation data 222 produced by one or more monitored locations 210-n. In one embodiment, sensor data 221 and/or aggregation data 222 can be distributed to defined destinations using JavaScript Object Notation (JSON) formatted packets.

In another example, a sensor application 230-n can specify, via web API 240, configuration settings for application to a sensor network at a monitored location 210-n. The control provided by the specification of these configuration settings via web API 240 enables a sensor application 230-n to remotely configure a sensor network at a monitored location 210-n. In various scenarios, the remote configuration commands would customize the operation of a sensor network at a monitored location 210-n to meet the needs of a given sensor application 230-n.

In one example, the customization of the operation of a monitored location 210-n can include an activation or deactivation of a sensor at the monitored location 210-n. This activation or deactivation can correspond to particular hours, days, weeks, months, or other periods of time. In one scenario, the activation or deactivation commands can correspond to relevant periods of interest in the sensor data, wherein the relevant periods of interest correspond to activity relating to tenant occupancy, auditing, monitoring and verification, sales support, or other activities that have non-contiguous periods of interest and/or control.

In another example, the customization of the operation of a monitored location 210-n can include a change in the operation of a sensor at the monitored location 210-n. In various scenarios, the change in operation of the sensor can relate to a sensitivity characteristic, an accuracy characteristic, a power characteristic, an energy saving characteristic, an operating mode characteristic, a data type or format characteristic, or any other characteristic that relates to an operation of the sensor or the data produced by the sensor. In one embodiment, the sensor is supported by a bridge unit having an interface (e.g., Modbus serial communication protocol) to the sensor. In this embodiment, the change in operation can relate to a device address, a function code, a register address, or any other parameter that facilitates a collection of sensor data via the interface. As would be appreciated, the specific interface supported by the bridge unit would be implementation dependent.

In another example, the customization of the operation of a monitored location 210-n can include a change in the operation of a node in a sensor network at the monitored location 210-n. In various scenarios, the customization can relate to a frequency of sensor data collection, a sampling frequency, a power characteristic, an energy saving characteristic, an operating mode characteristic (e.g., reset command), a data type or format characteristic, a sensor network preference, or any other characteristic that relates to an operation of the node.

After customization commands have been forwarded to a monitored location 210-n, the monitored location 210-n can return system status information via web API 240. This system status information can be recorded in the database as system status 224. A sensor application 230-n can then retrieve system status information from host system 220 via web API 240 to confirm that the requested configuration changes have been correctly implemented by the sensor network at the monitored location 210-n.

The configuration afforded via web API 240 enables a sensor application 230-n to customize the operation of a sensor network from a location remote from the monitored location 210-n. Notably, the sensor application 230-n can customize the operation of only part of the sensor network at a monitored location 210-n. For example, a first sensor application can be configured to provide an energy management company with a view of sensor data relating to power consumption at a building, while a second sensor application can be configured to provide a tenant in the building with a view of sensor data relating to ambient conditions (e.g., temperature and humidity) in a part of the building. As these examples illustrate, a plurality of sensor applications 230-n can be configured to leverage different subsets of sensors at one or more monitored locations 210-n. From that perspective, host system 220 provides a sensor service to a plurality of sensor applications 230-n having varied interests into the detected physical environment at the various monitored location 210-n.

Sensor applications can be generated for use across a variety of categories. A first example category can include Resource Management sensor applications that can each be configured to manage consumable resources such as electricity, water, gas, storage space, office space, conference rooms, or any other measured resource. A second example category can include Monitoring and Verification sensor applications that can each be configured to monitor and verify operation of a system (e.g., HVAC) in a monitored location. In one example, a monitoring and verification application can be used to perform audits of a system in a monitored location. A third example category can include Tenant Billing sensor applications that can each be configured to generate bills for tenants for measured usage of some resource (e.g., electricity). A fourth example category can include Reports and Alerts sensor applications that can each be configured to perform compilation and analysis of sensor data and/or aggregation data. In one example, an alert sensor application can include complex analytic functions that can predict occurrence of future maintenance actions at a monitored location based on historical data produced by one or more sensors. A fifth example category can include Control sensor applications that can each be configured to implement a control action based on an analysis of sensor data and/or aggregation data. In one example, a control sensor application can be configured to restrict usage of a consumable resource based on an analysis of current usage relative to a budget. A sixth example category can include Industry Specific sensor applications that are targeted to a particular industry context. For example, a first set of sensor applications can be specifically directed to the particular needs of schools, while a second set of sensor applications can be specifically directed to the particular needs of condominium buildings. As would be appreciated other categories of applications that leverage sensor data can be defined for any market segment.

Figure 3:
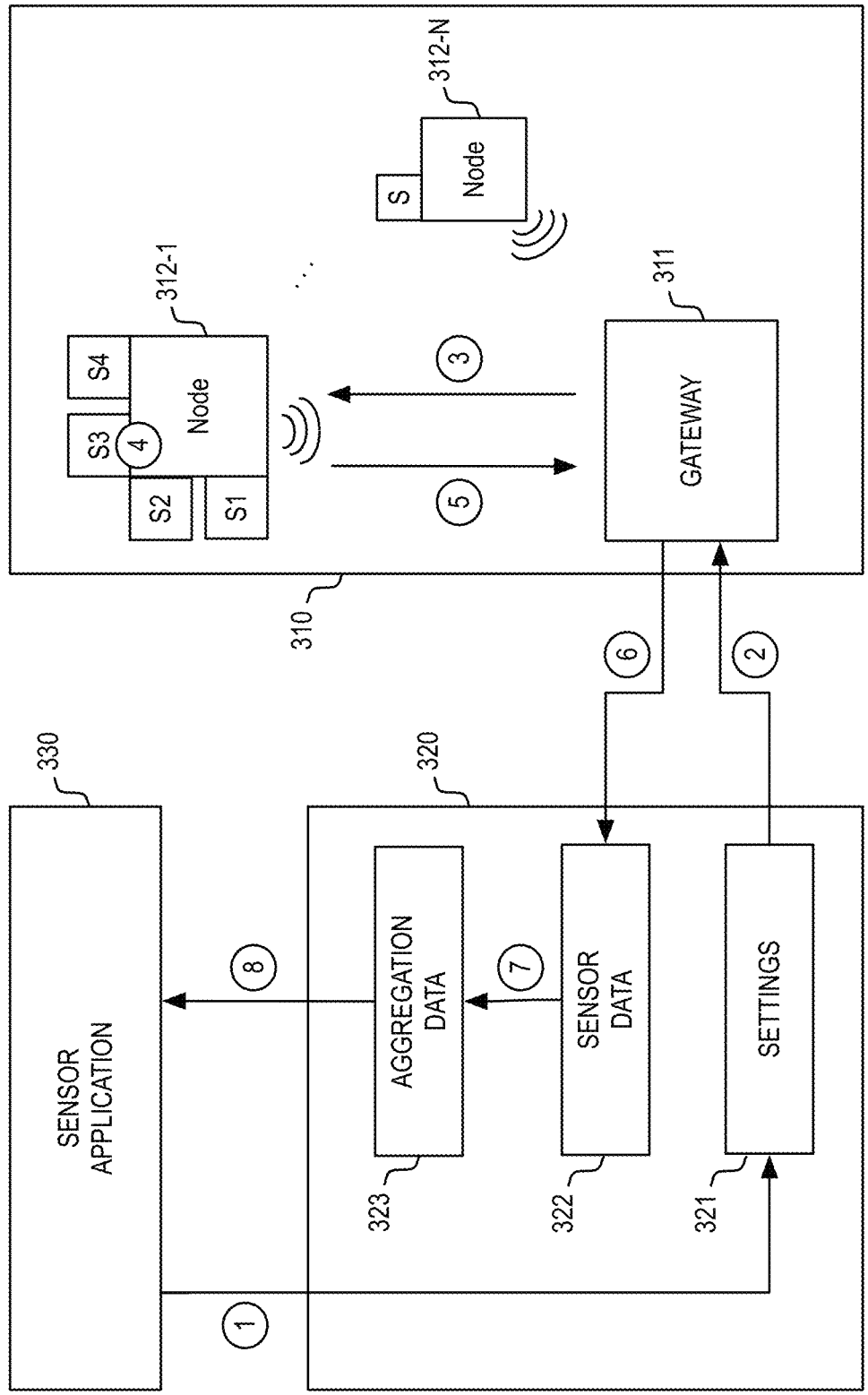
FIG. 3 illustrates an example of a sensor application process.

To illustrate the operation of a host system in providing a sensor service, reference is now made to FIG. 3, which illustrates an example of a sensor application process. As illustrated, monitored location 310 includes gateway 311, which communicates with host system 320 via a network connection. The network connection can be embodied in various forms depending upon the particular characteristics of monitored location 310. For example, where monitored location 310 is a building in a developed area, then the network connection can be facilitated by a wired Internet connection via an Internet service provider (ISP). In another example, the network connection can be facilitated by a terrestrial or satellite based wireless network to accommodate a remote physical area (or movable area) that may or may not include a building structure. Here, it should be noted that multiple gateways can be used at a monitored location, wherein each gateway supports a different set of nodes and has a separate network connection to the host system.

In one embodiment, gateway 311 communicates wirelessly with a plurality of node devices 312-n that form a sensor network. In one embodiment, the communication protocol between the plurality of node devices 312-n is based on the IEEE 802.15.4 protocol. The sensor network facilitates a communication infrastructure that can be used to support the retrieval by host system 320 of sensor data gathered by the plurality of node devices 312-n and/or bridge units supported by the plurality of node devices 312-n. In one embodiment, each of node devices 312-n can be configured to support one or more bridge units. For example, node device 312-1 is illustrated as supporting bridge units S1-S4. As will be described in greater detail below, each bridge unit can be configured to support one or more sensors.

In the example process of FIG. 3, assume that sensor application 330 requires (1) data from sensor readings from sensors supported by bridge unit S3 attached to node device 312-1 to be taken every 60 seconds, (2) a voltage measurement and current measurement to be combined into a power measurement, and (3) the resulting power measurement data to be placed into a particular data format for input into an analytics module of sensor application 330. In various scenarios, the data format can relate to singular data values and/or can relate to multiple data values.

As illustrated, the process can begin with the communication by sensor application 330 of configuration settings to host system 320. This part of the process is illustrated as process element "1" in FIG. 3. In one embodiment, sensor application 330 can submit configuration settings to host system 320 via web APIs. The submitted configuration settings can be stored in a database as settings 321, and can be used as the basis for adjusting the configuration of the sensor network at monitored location 310 and to adjust the processing of sensor data 322 received from monitored location 310. In this example, a first configuration setting can be stored that would be the basis for modifying a data collection period of the sensors supported by bridge unit S3 attached to node device 312-1, a second configuration setting can be stored that would be the basis for a conversion function for generation of a power measurement from a voltage measurement and current measurement taken by the sensors supported by bridge unit S3 attached to node device 312-1, and a third configuration setting can be stored that would be the basis for a conversion function to place the generated power measurement into the data format desired by sensor application 330.

As illustrated in FIG. 3, the stored configuration settings 321 that specify the new data collection period can be used by host system 320 in generating a configuration setup request (illustrated as process element "2" in FIG. 3) for delivery to gateway 311 at monitored location 310. In one embodiment, the configuration setup request is an HTTP message delivered in response to a system status message from node device 312-1 (e.g., HTTP POST method) received by host system 320 from gateway 311 via the web API. For example, when the system status message is received, host system 320 can compare the current configuration settings (e.g., default sensor data collection period) to the newly stored custom configuration setting in the database. When the comparison indicates that the current configuration does not match the newly stored custom configuration setting, then host system 320 can initiate the transmission of a configuration setup request having the newly stored custom configuration setting.

In one embodiment, the comparison can be based on a comparison of two computed hash values. The first computed hash value can be generated by node device 312-1 based on the current configuration settings of node device 312-1 or a bridge unit attached to node device 312-1 and can be returned to host system 320 as part of a system status message by node device 312-1. The second computed hash value can be generated by host system 320 based on the stored configuration settings 321 for node device 312-1 or a bridge unit attached to node device 312-1. One of the advantages of using hash values to confirm the configuration settings of a node device or bridge unit is that it would obviate the need for the node device to transmit all of the configuration settings of the node device or bridge unit back to the host system for comparison.

Where the configuration setup request relates to an operation of node device 312-1, gateway 311 can deliver a configuration update packet containing the configuration update information to node device 312-1 via the sensor network. This communication is illustrated as process element "3" in FIG. 3. Based on the receipt of configuration update information via the sensor network, node device 312-1 can adjust the data collection period for bridge unit S3. This configuration change is illustrated as process element "4" in FIG. 3. Based on the change in configuration, node device 312-1 can collect sensor readings from bridge unit S3 at the newly defined collection period (e.g., 60 seconds). The sensor data values collected at the newly defined collection period can then be delivered by node device 312-1 to gateway 311 in data packets via the sensor network. This communication is illustrated as process element "5" in FIG.

In forwarding the received sensor data values to host system 320, gateway 311 can prepare an HTTP POST method that submits the latest sensor data value for recording in the database. This communication is illustrated as process element "6" in FIG. 3. The received sensor data value can be stored in a database as sensor data 322.

Based on the first defined conversion function stored in settings 321, host system 320 can transform sensor data 322 into aggregation data 323. For example, host system 320 can transform a first sensor data value based on a voltage measurement and a second sensor data value based on a current measurement into an aggregation data value reflective of a power measurement. Based on the second defined conversion function stored in settings 321, host system 320 can place one or more aggregation data values into a data format desired by sensor application 330. In one example, the second defined conversion function defines a data format for the singular power measurement data values. In another example, the second defined conversion function defines a data format for multiple power measurement values in a report. In the illustration of FIG. 3, the combined conversion process of the first and second defined conversion functions is illustrated as process element "7". The resulting aggregation data 323 has now been prepared for the particular use by sensor application 330. In one embodiment, sensor application 330 can retrieve sensor data and/or aggregation data 323 using an HTTP GET method via the web API. The communication of sensor data 322 and/or aggregation data 323 from host system 320 to sensor application 330 is illustrated as process element "8" in FIG. 3.

As this example process illustrates, sensor application 330 can configure a sensor network at a monitored location using a web API. In this manner, any sensor application can configure an operation of any sensor network at any monitored location to suit its particular needs. Moreover, any sensor application can configure a customized processing of sensor data collected from any sensor network at any monitored location to suit its particular needs. In essence, sensor application 330 can define and configure the particular SaaS it desires to receive from host system 320. Significantly, sensor application 330 need not have any connection to the installation of the sensor network at the monitored location. From the perspective of sensor application 330, the sensor network is part of an established infrastructure that is used only when sensor data is needed and in a scope that is defined by sensor application 330.

Figure 4:
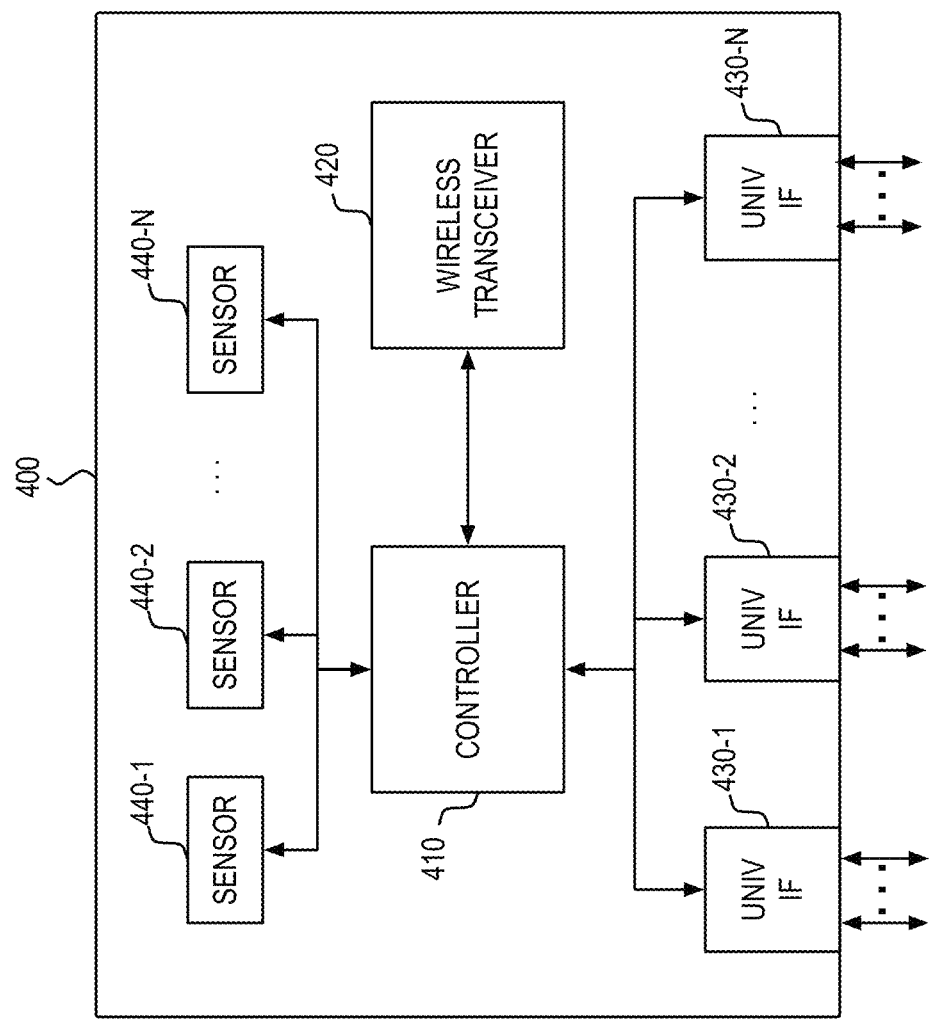
FIG. 4 illustrates an example embodiment of a node device.

FIG. 4 illustrates an example embodiment of a node device in the sensor network. As illustrated, node device 400 includes controller 410 and wireless transceiver 420. Wireless transceiver 420 facilitates wireless communication between node device 400 and a gateway or another node device that operates as a relay between node device 400 and the gateway. In one embodiment, node device 400 includes a wired transceiver (e.g., Ethernet) in addition to or as a replacement for wireless transceiver 420. The wired transceiver would enable node device 400 to communicate with a gateway over a wired link.

Controller 410 collects sensor measurements from a set of bridge units via one or more universal sensor interfaces 430-$n$. Controller 410 can also collect measurements from one or more sensors 440-$n$ that are contained within or otherwise supported by a housing of node device 400. In various scenarios, the one or more sensors 440-$n$ can facilitate monitoring at that part of the monitored location, including the health and/or status of node device 400. Each universal sensor interface 430-$n$ can support the connection of node device 400 with a separate bridge unit. The plug-and-play universal sensor interface facilitates the separation of the node communication infrastructure from the sensor-specific interfaces supported by the set of one or more bridge units that are deployed at the location at which the supporting node is installed.

Universal sensor interfaces 430-$n$ can represent a combination of hardware and software. The hardware portion of universal sensor interfaces 430-$n$ can include a wired interface that enables communication of different signals between node device 400 and a connected bridge unit. In one example, the wired interface can be enabled through a connector interface, which is exposed by the housing of node device 400, and that is configured to receive a bridge unit connector via removable, pluggable insertion.

In one embodiment, the wired interface can be based on a Serial Peripheral Interface (SPI) bus. In one example, the wired interface enables six connections: supply, ground, data in, data out, clock, and device select. The device select connection can be unique to each wired interface and can enable controller 410 in node device 400 to select the particular bridge unit with which node device 400 desires to communicate.

The software portion of the universal sensor interfaces 430-$n$ can include a protocol that allows node device 400 to send data to and receive data from a bridge unit. In one example, controller 410 can be configured to poll the various universal sensor interfaces 430-$n$ to determine whether any bridge units are connected. As part of this protocol, controller 410 can first request a sensor ID from a bridge unit. If the response read is "0", then controller 410 would know that no bridge unit is connected to that universal sensor interface 430-$n$. If, on the other hand, the response read is not "0", then controller 410 would ask for the number of data values that have to be retrieved and the number of bits on which the data values are coded. In one example, the higher order 8-bits of a 16-bit communication between controller 410 and a bridge unit identifies the number of data values, while the lower order 8-bits of the 16-bit communication identifies the number of bits used to code each data value. Based on the number of data values to be retrieved, controller 410 would then collect that number of data values, wherein each value can represent a different sensor channel of the bridge unit.

A gateway can be configured to operate similarly to a node device. In addition to wireless transceiver 420, a gateway can include a second transceiver (e.g., Ethernet) that supports a network connection with the operation center. The gateway can also collect data based on measurements by a plurality of sensors that are contained within or otherwise supported by a housing of the gateway. Finally, the gateway can also collect data from a bridge unit that is connected to the gateway via a universal sensor interface. In one embodiment, the gateway includes a single universal sensor interface for limited expandability as compared to node devices.

Figure 5:
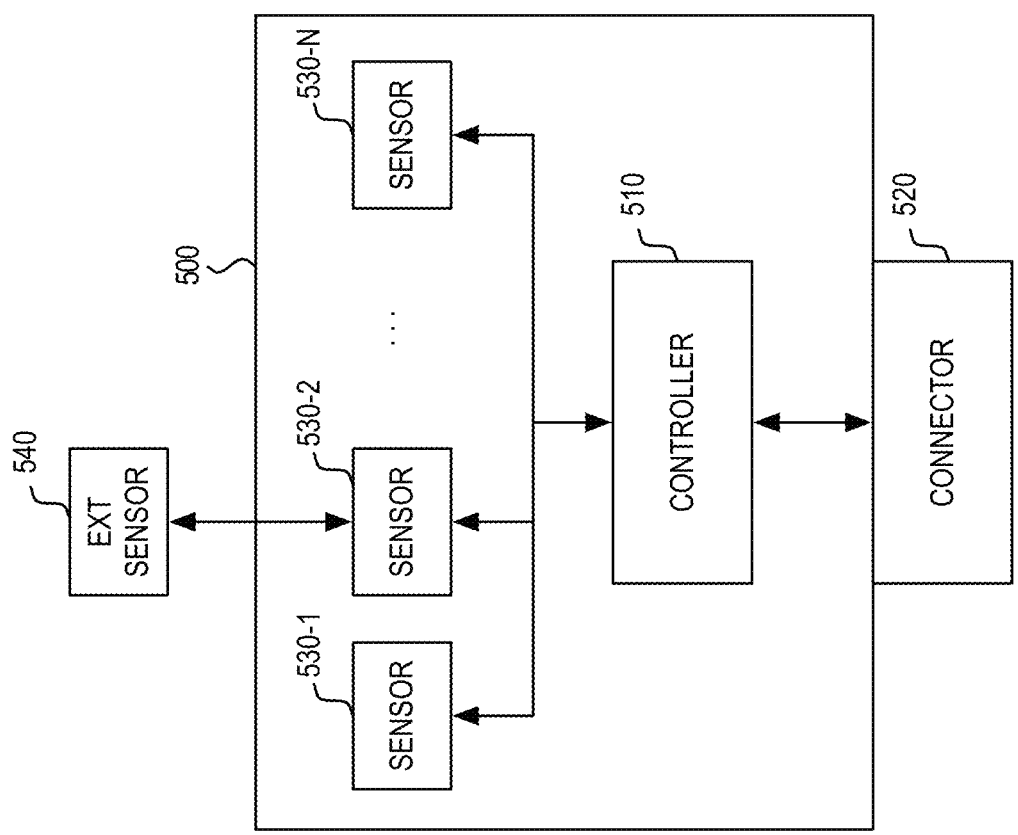
FIG. 5 illustrates an example embodiment of a bridge unit.

FIG. 5 illustrates an example embodiment of a bridge unit designed for attachment to a node device, an example of which was described with reference to FIG. 4. As illustrated, bridge unit 500 includes controller 510 that communicates over a universal sensor interface with a supporting node device. In one embodiment, bridge unit 500 supports the universal sensor interface with a connector 520 configured for pluggable, removable insertion into a corresponding connector interface exposed by the supporting node device. In another embodiment, the bridge unit can be coupled to the connector interface exposed by the supporting node device via a connector attached to a cable.

Bridge unit 500 can support a plurality of sensor elements 530-$n$. For example, sensor elements supported by bridge unit 500 can enable one or more of the following: a temperature sensor application, a humidity sensor application, an air quality (e.g., $CO_2$) sensor application, a light sensor application, a sound sensor application, an occupation sensor application, a radiation sensor application, a contact sensor application, a pulse sensor application, a water sensor application, a power sensor application, a credential sensor application, or any other type of sensor application configured to measure a characteristic associated with a physical environment of a part of the monitored location.

In one embodiment, a sensor element can cooperate with an external sensor element to produce sensor data. For example, sensor element 530-2 can cooperate with external sensor element 540 to gather energy monitoring data. In one scenario, sensor element 530-2 can be embodied as a pulse sensor that is configured to connect to an external energy monitoring meter product. In another scenario, sensor element 530-2 can communicate with external sensor element 540 via a Modbus interface, BACnet interface, or any other interface designed for communication with a monitoring product. As would be appreciated, the particular method of cooperation between internal and external sensor elements supported by bridge unit 500 would be implementation dependent.

Figure 6:
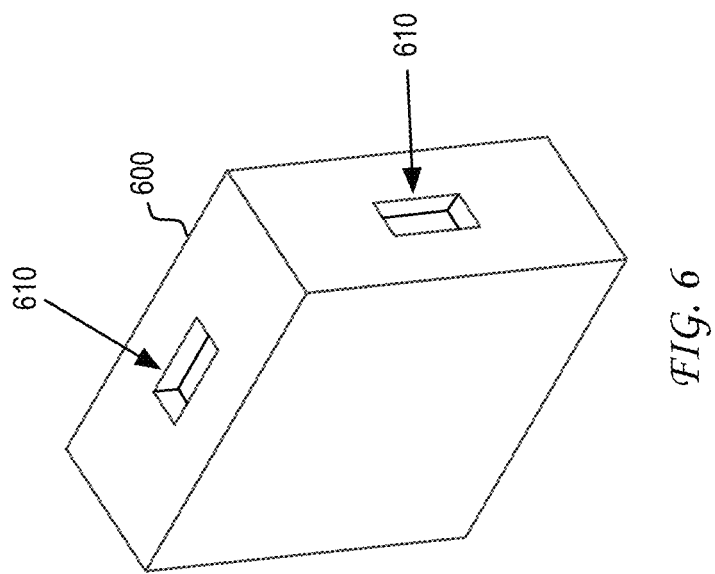
FIG. 6 illustrates an example embodiment of a housing of a node device that exposes connector interfaces.

The plug-and-play nature of the connection of bridge units to supporting node devices facilitates a modular framework for installation of nodes at a monitored location. FIG. 6 illustrates an example embodiment of a housing of a node device such as the example illustration of node device 400 in FIG. 4. As illustrated, node device 600 can have a housing configured to expose a plurality of connector interfaces 610. Each of the plurality of connector interfaces 610 can support the physical attachment of a single bridge unit. In the example illustration, each side of the housing of node device 600 exposes a single connector interface 610. In the present disclosure, it is recognized that the housing of the node device can be substantially larger than the housing of the bridge unit. This can result, for example, because the node device can be designed with additional components such as an internal power source (e.g., battery) that can involve additional volume requirements as compared to the bridge units. It is therefore recognized that one embodiment of a node device can have multiple bridge units physically attached to a single side of the node device.

Figure 7:
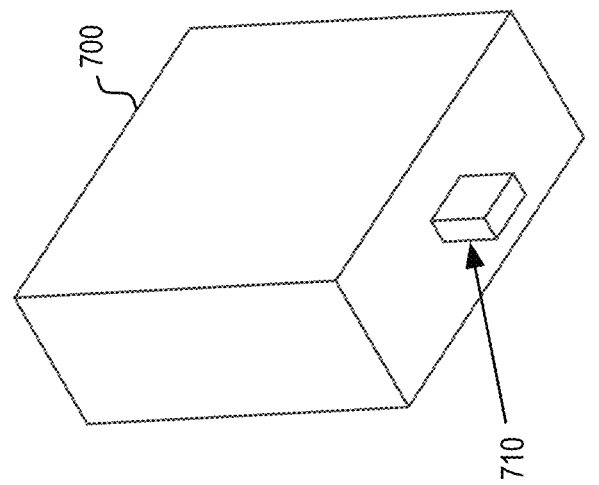
FIG. 7 illustrates an example embodiment of a housing of a bridge unit.

FIG. 7 illustrates an example embodiment of a housing of a bridge unit such as the example illustration of bridge unit 500 in FIG. 5. As illustrated, bridge unit 700 can have a housing configured to support a connector 710. Connector 710 can be configured for pluggable, removable insertion into a corresponding connector interface 610 exposed by the housing of node device 600. The connection of bridge unit 700 to node device 600 via the insertion of connector 710 into connector interface 610 produces a true plug-and-play framework for the deployment of sensors at a monitored location.

Figure 8:
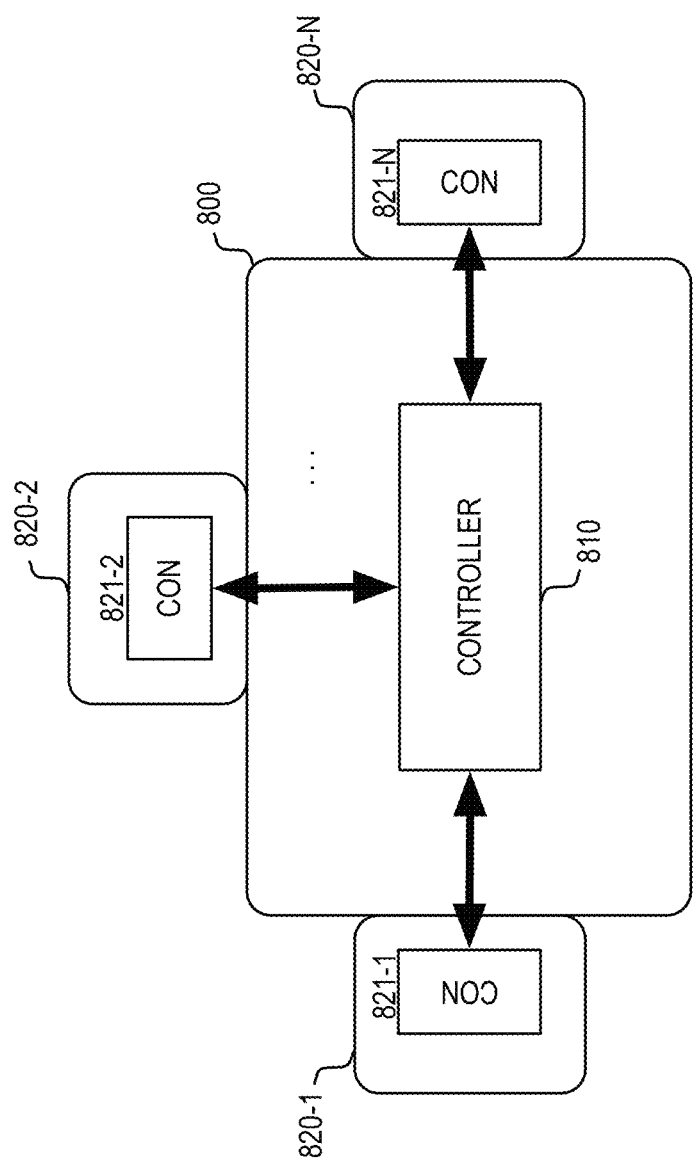
FIG. 8 illustrates an example embodiment of a node device attached to a plurality of bridge units.

FIG. 8 illustrates an example data flow between a node device, such as the example illustration of node device 400 in FIG. 4, and a plurality of supported bridge units. As illustrated, node device 800 interfaces with a plurality of bridge units, including bridge unit 820-1, bridge unit 820-2, . . . , and bridge unit 820-N. Connectors of bridge unit 820-1, bridge unit 820-2, . . . , and bridge unit 820-N are each physically attached to separate connector interfaces exposed by the housing of node device 800. The attachment of bridge unit 820-1 to node device 800 enables communication of data between controller 821-1 and controller 810, the attachment of bridge unit 820-2 to node device 800 enables communication of data between controller 821-2 and controller 810, . . . , and the attachment of bridge unit 820-N to node device 800 enables communication of data between controller 821-N and controller 810. By these attachments, each of bridge units 820-1, 820-2, . . . , and 820-N can be coupled to node device 800 via a universal sensor interface having the connectivity characteristics described above.

As noted, the sensor network formed by node devices at a monitored location creates a communication infrastructure. This communication infrastructure enables the host system to gather sensor data from various sensor elements supported by a plurality of bridge units dispersed around the monitored location. In the present disclosure, it is recognized that the ease by which the communication infrastructure can be established and respond to dynamic changes is a key factor in enabling cost-effective deployment of a sensor network at a monitored location.

Figure 9:
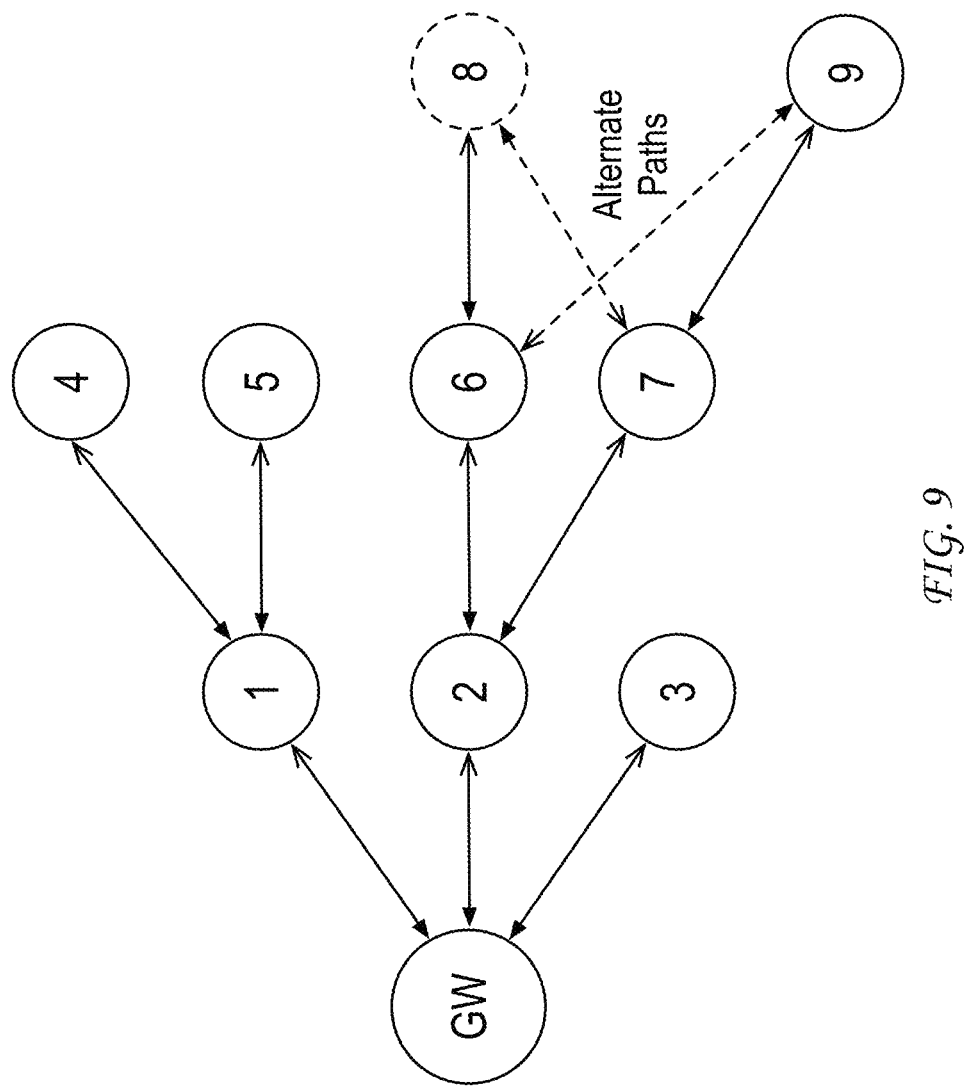
FIG. 9 illustrates an example of a sensor network at a monitored location.

FIG. 9 illustrates an example of a sensor network that can be established at a monitored location. The example sensor network includes a gateway (GW) that is wirelessly connected to nodes 1, 2, and 3. In turn, node 1 is wirelessly connected to nodes 4 and 5, while node 2 is wirelessly connected to nodes 6 and 7. Finally, node 6 is wirelessly connected to node 8, while node 7 is wirelessly connected to node 9. As this example sensor network illustrates, a node can operate as a relay node in facilitating communication between another node and the gateway.

The topology of a sensor network at a monitored location can be dynamic as nodes can be added or removed from the sensor network. For example, a node can be removed from the sensor network due to damage, loss of power, or failure of the node. If the node that has been removed from the sensor network operated as a relay node for one or more other nodes, then the one or more other nodes would need to find an alternate path through the sensor network to the gateway. In the example sensor network configuration of FIG. 8, a failure of node 7 can lead node 9 to identify an alternate path to the gateway via node 6.

In another example, a node can be added to the sensor network to accommodate new sensor requirements at the monitored location. In one scenario, the sensor requirements at a commercial building can change based on the introduction of new government regulations (e.g., $CO_2$ level monitoring). The changing regulatory environment can dictate that new sensor data be collected from different parts of the monitored location. A new node having one or more bridge units that support the collection of the new sensor data can be installed at the monitored location. The newly installed node would need to identify a connection point that enables the best path through the sensor network to the gateway. The nature of IoT suggests that sensor needs at a monitored location will be dynamic as additional uses of sensor technology are leveraged at a particular monitored location. In the example sensor network configuration of FIG. 8, the installation of node 8 at the monitored location can lead node 8 to determine that a connection to node 6 provides the best path to the gateway as compared to an alternate path to the gateway via node 7.

Figure 10:
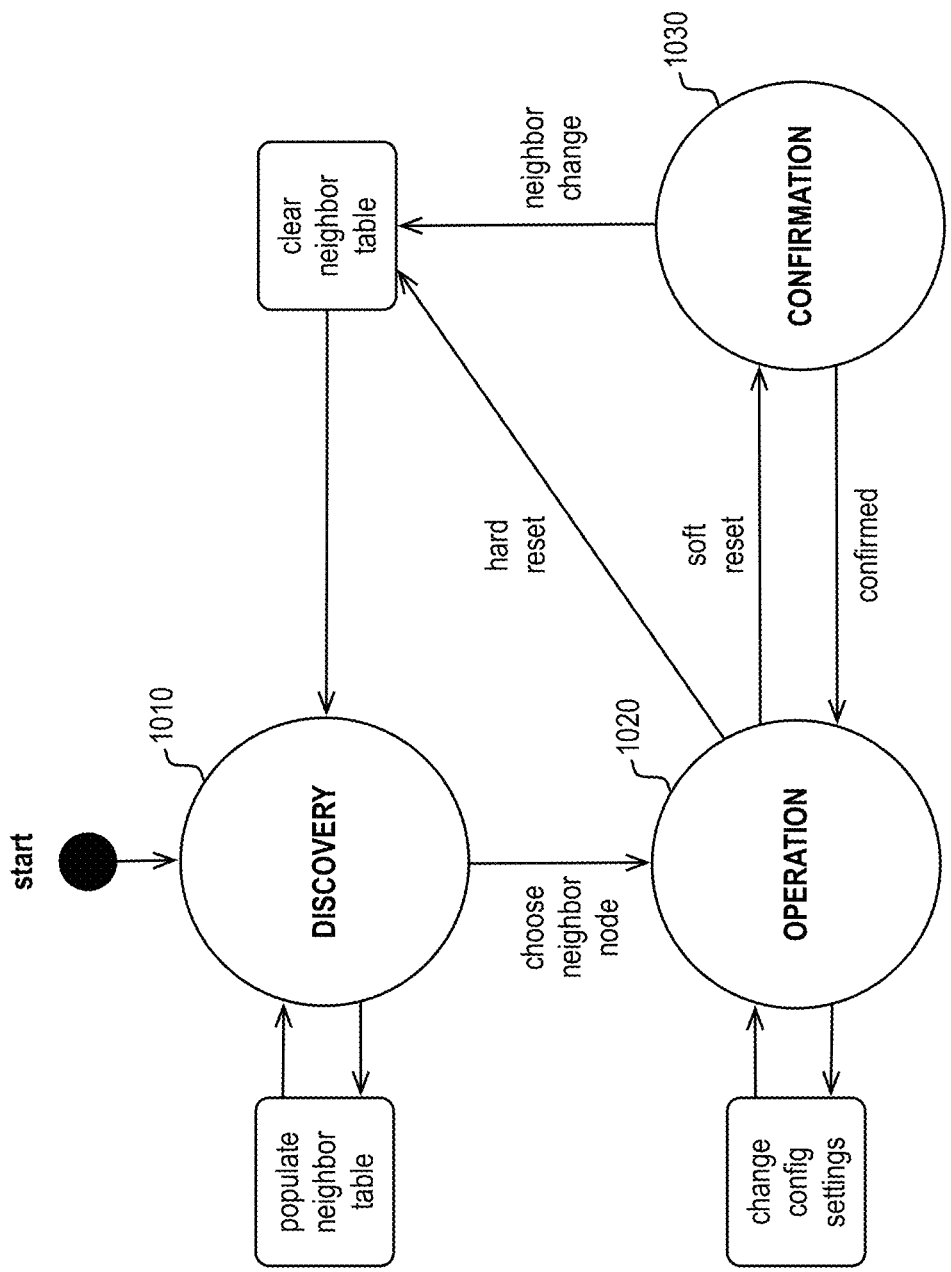
FIG. 10 illustrates an example state diagram of an operation of a node in a sensor network.

FIG. 10 illustrates an example state diagram of an operation of a node in a sensor network. This high-level state diagram illustrates the functionality that enables a node to connect to a sensor network and to respond to changes in the sensor network. As illustrated, the high-level state diagram includes discovery state 1010, operation state 1020, and confirmation state 1030. In general, discovery state 1010 can represent the state during which the node discovers neighbor nodes and identifies a particular discovered neighbor node for connection to the sensor network, operation state 1020 can represent the state during which the node can collect and forward senor data to the gateway after connection to a sensor network, and confirmation state 1030 can represent the state during which the node confirms its view of previously discovered neighbor nodes in the sensor network.

A node that is newly installed at a monitored location has no knowledge of an existing sensor network operating at the monitored location. In one embodiment, the newly installed node would power up and enter discovery state 1010 to discover the existence of nodes operating near the location at which the node was installed. In one embodiment, discovery state 1010 functions to populate a neighbor table that includes a set of discovered neighbor nodes usable by the node in facilitating communication with a gateway at the monitored location.

Figure 11:
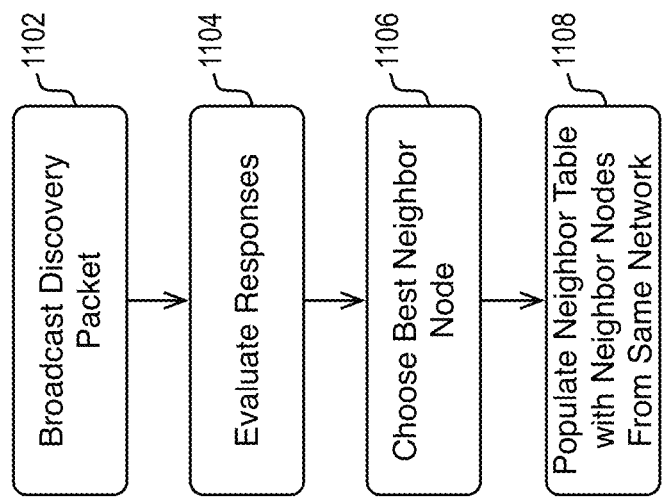
FIG. 11 illustrates a flowchart of an example discovery process by a node.

FIG. 11 illustrates a flowchart of an example discovery process by a node. As illustrated, the process begins at step 1102 where the node broadcasts a discovery packet. The specific form of the discovery packet can vary depending on the communication protocol. In an embodiment where the communication protocol is based on IEEE 802.15.4, the discovery packet can be directed to all device addresses on all personal area network (PAN) IDs.

Next, at step 1104, the node evaluates the response packets returned by the responding neighbor nodes. In general, any node in proximity to the newly installed node that receives the discovery packet can respond with a response packet. In one embodiment, the response packet is directed to the broadcasting node and can include a distance (e.g., number of hops) from the answering node to the gateway. Where the answering node is the gateway, then the reported distance would be zero. Where the answering node is a relay node, then the reported distance would be the number of hops from the answering node to the gateway. In one example, a node can be programmed to select a neighbor node that has the smallest reported distance to the gateway. The distance to the gateway represents one example of criteria that can be used to evaluate responses to the discovery packet. In other embodiments, criteria such as a link quality indicator (LQI), a received signal strength indicator (RSSI), or other criteria useful to evaluate the relative value of a connection to a neighbor node can be used to evaluate responses to the discovery packet.

Based on the evaluation of the response packets, the node then chooses, at step 1106, the best neighbor node for use in communicating with the sensor network. In one embodiment, the node can also populate, at step 1108, a neighbor table with additional neighbor nodes from the same sensor network. For example, the additional neighbor nodes can have the same network ID (e.g., PAN ID) as the best neighbor node. This neighbor table can be designed to store additional neighbor nodes that can be used should communication with the selected best neighbor node be disrupted.

As illustrated in the state diagram of FIG. 10, the choice of a neighbor node would enable the node to enter operation state 1020. During operation state 1020, the chosen neighbor node would facilitate bi-directional communication between the node and the sensor network. This bi-directional communication can include upstream communication that includes messages from the node to the host system, and downstream communication that includes messages from the host system to the node.

In one example, the upstream communication can facilitate the transmission of data packets that include sensor data collected by the node device and/or one or more attached bridge units. In another example, the upstream communication can facilitate the transmission of status packets that include status information reflecting the current state of operation and configuration of the node and/or one or more attached bridge units.

In one example, the downstream communication can facilitate the transmission of configuration update information from the host system to the node, wherein the configuration update information can be used to change a configuration of the node and/or one or more attached bridge units. In another example, the downstream communication can facilitate the transmission of action information form the host system to the node, wherein the action information can be used to effect a remotely-initiated action for the node and/or one or more attached bridge units.

During operation state 1020, the node can be remotely configured using configuration update information that is generated by the host system and passed to the node via the chosen neighbor node. In the example described above, a sensor application can specify, via web APIs, configuration settings for application to a particular node in a sensor network at a monitored location. The specified configuration settings can be used to generate an update packet that is delivered to the node to effect a change in the node's configuration settings. Remote configuration and maintenance of nodes greatly reduces the costs of administrating the sensor network at a monitored location.

One of the challenges of maintaining a sensor network at a monitored location is dealing with node operational issues. Nodes can malfunction for a variety of reasons, some of which may not be diagnosed from a location remote from the monitored location. In this scenario, it is undesirable to dispatch administrative personnel to perform on-site diagnostics. The costs associated with on-site diagnostics dictate that the dispatch of administrative personnel should only be performed as a matter of last resort.

In the present disclosure, it is recognized that remotely-controlled resets of nodes can provide an opportunity to obviate the need to dispatch administrative personnel to a monitored location. In one embodiment, the host system can provide a user with controls that can be used to initiate multiple types of remotely-controlled resets. In one example, the host system provides a remote user with controls that can be used to initiate a hard reset or a soft reset of a node. In one scenario, a remotely-controlled hard reset command can be designed to restart the node in its original non-configured state, while a remotely-controlled soft reset command can be designed to restart the node using the last saved configuration settings.

Figure 12:
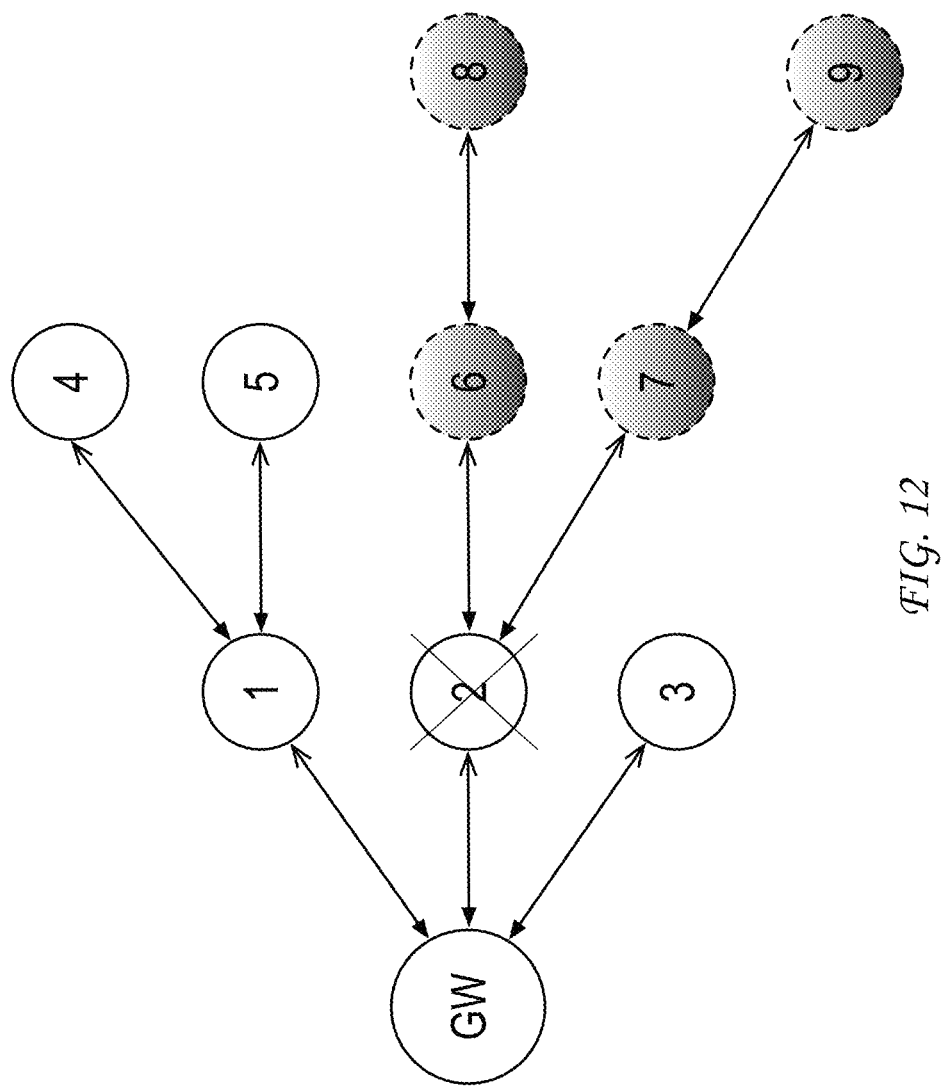
FIG. 12 illustrates an example impact of a discovery operation in a sensor network.

The selective remote initiation of one of multiple types of node resets can help minimize the disruption of a sensor network. FIG. 12 illustrates an example of the potential disruption in a sensor network due to a node reset. Like the illustration of FIG. 9, nodes 1-9 can form a sensor network that facilitates bi-directional communication between GW and each of nodes 1-9. In this example sensor network, assume that node 2 malfunctions. For example, the host system can receive a status packet from node 2 that indicates that one or more remote configuration commands previously sent to node 2 in one or more configuration update packets have not been implemented by node 2.

If a remote user responds to this scenario by initiating a remotely-controlled hard reset command, then a cascading disruption of the sensor network can occur. First, upon receipt of the remotely-controlled hard reset command, node 2 would erase its stored configuration settings and initiate a restart. Since the stored configuration settings would include the neighbor table generated by a previous discovery process such as that illustrated in FIG. 11, node 2 would reenter the discovery process to choose a neighbor node for communication with the sensor network at the monitored location. As illustrated in the state diagram of FIG. 10, the clearance of the neighbor table is a precursor to the return by the node to discovery state 1010.

Once node 2 enters the discovery state, nodes 6 and 7 would then enter the discovery state. This can occur, for example, when nodes 6 and 7 receive the discovery packet that is broadcast by node 2. The receipt of node 2's broadcasted discovery packet would indicate to nodes 6 and 7 that something may have changed in the topology of the sensor network. Nodes 6 and 7 could then initiate the discovery process for themselves to determine anew the best neighbor node to use in a potentially changed sensor network topology. Subsequently, the receipt of node 6's broadcasted discovery packet would indicate to node 8 that something may have changed in the topology of the sensor network, while the receipt of node 7's broadcasted discovery packet would indicate to node 9 that something may have changed in the topology of the sensor network. Nodes 8 and 9 could then initiate the discovery process for themselves to determine anew the best neighbor node to use in a potentially changed sensor network topology. As this disruption scenario illustrates, the remotely-controlled hard reset command can produce a cascading disruption of the sensor network.

To prevent such a disruption, a remote user can alternatively initiate a remotely-controlled soft reset command. As noted, the remotely-controlled soft reset command can be designed to restart node 2 using the last saved configuration settings. When node 2 restarts after receipt of the remotely-controlled soft reset command, node 2 would retain its neighbor table generated by a previous discovery process. In one embodiment, the remotely-controlled soft reset command would cause node 2 to enter a confirmation state. FIG. 10 illustrates such a state transition in the transition from operation state 1020 to confirmation state 1030. In general, confirmation state 1030 can be designed to confirm the status of at least part of the sensor network reflected by the neighbor table. When the status is confirmed, the node can transition back to operation state 1020.

Figure 13:
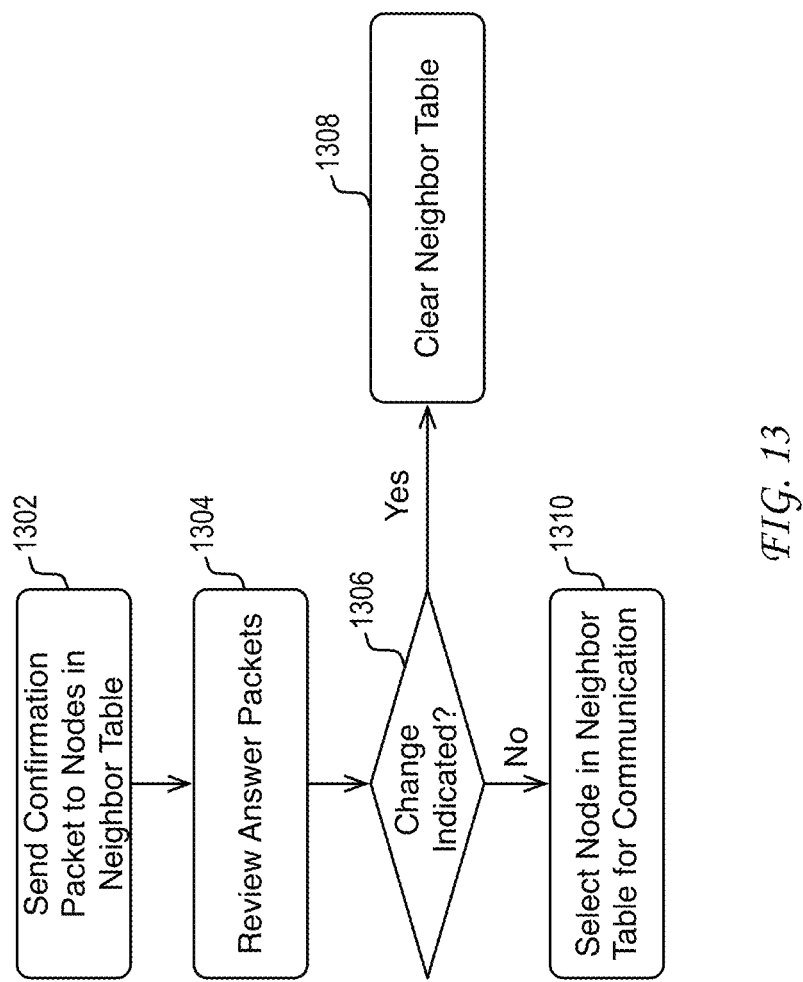
FIG. 13 illustrates a flowchart of an example confirmation process by a node.

FIG. 13 illustrates a flowchart of an example confirmation process that can be implemented by a node. As illustrated, the process can begin at step 1302 where a node can send a confirmation packet to each node in the neighbor table. At step 1304, the node can then review the answer packets returned in response to the confirmation packets. In one embodiment, the answer packets can include a distance (e.g., number of hops) from the answering node to the gateway.

In general, the review of the answer packets can be designed to determine whether a change in the sensor network is indicated. In one example, a change in the topology of the sensor network can be indicated when there is a failure to receive an answer packet from a node in the neighbor table. The can be the case where the neighbor node is no longer in proximity to the node sending the confirmation packet. In another example, a change in the topology of the sensor network can be indicated when there is a change in the reported distance of a node in the neighbor table. This can be the case where a change in the sensor network has caused the neighbor node to connect to the gateway via a different path.

The review of the answer packets enables the node to determine at step 1306 whether a change in the sensor network is indicated. Where a change in the sensor network is indicated by the determination, then the neighbor table is unlikely to represent the best means for communicating with the sensor network. The node can then be configured to clear the neighbor table at step 1308. As illustrated in the state diagram of FIG. 10, the clearance of the neighbor table is a precursor to the return by the node to discovery state 1010, where the existence of nodes operating near the location at which the node was installed can be determined. Where a change in the sensor network is not indicated by the determination, then the process continues to step 1310 where the node can select a neighbor node from the neighbor table for use in establishing bi-directional communication with the sensor network.

As described, the remotely-controlled soft reset command can confirm the status of the nodes in the neighbor table without launching a discovery process. Where no change in the sensor network is indicated, communication can continue with a previously-discovered node identified by the neighbor table. From the perspective of the downstream nodes, their connectivity to the sensor network has not changed, thereby obviating their own need to enter a discovery process. Disruption in the sensor network is therefore minimized.

In addressing a malfunction of a node, a remote user can choose to initiate a remotely-controlled soft reset command first. In many instances, the soft reset of the malfunctioning node in response to the receipt of the remotely-controlled soft reset command would cure the node malfunction. A cascading disruption of the sensor network would therefore be prevented. If the soft reset of the malfunctioning node does not cure the node malfunction, then the remote user could choose to initiate a remotely-controlled hard reset command. While the hard reset of the node can produce a cascading disruption, the remote user can be assured that any cascading disruption is only produced as necessary to effect proper system maintenance.

As has been described, remotely-controlled reset commands of different types can be used to perform sensor network maintenance in a targeted fashion to minimize disruption to the sensor network. Maintaining connectivity amongst the nodes in the sensor network is a key factor to ensuring that sensor data from the various nodes can be routed to the host system via the sensor network.

Figure 14:
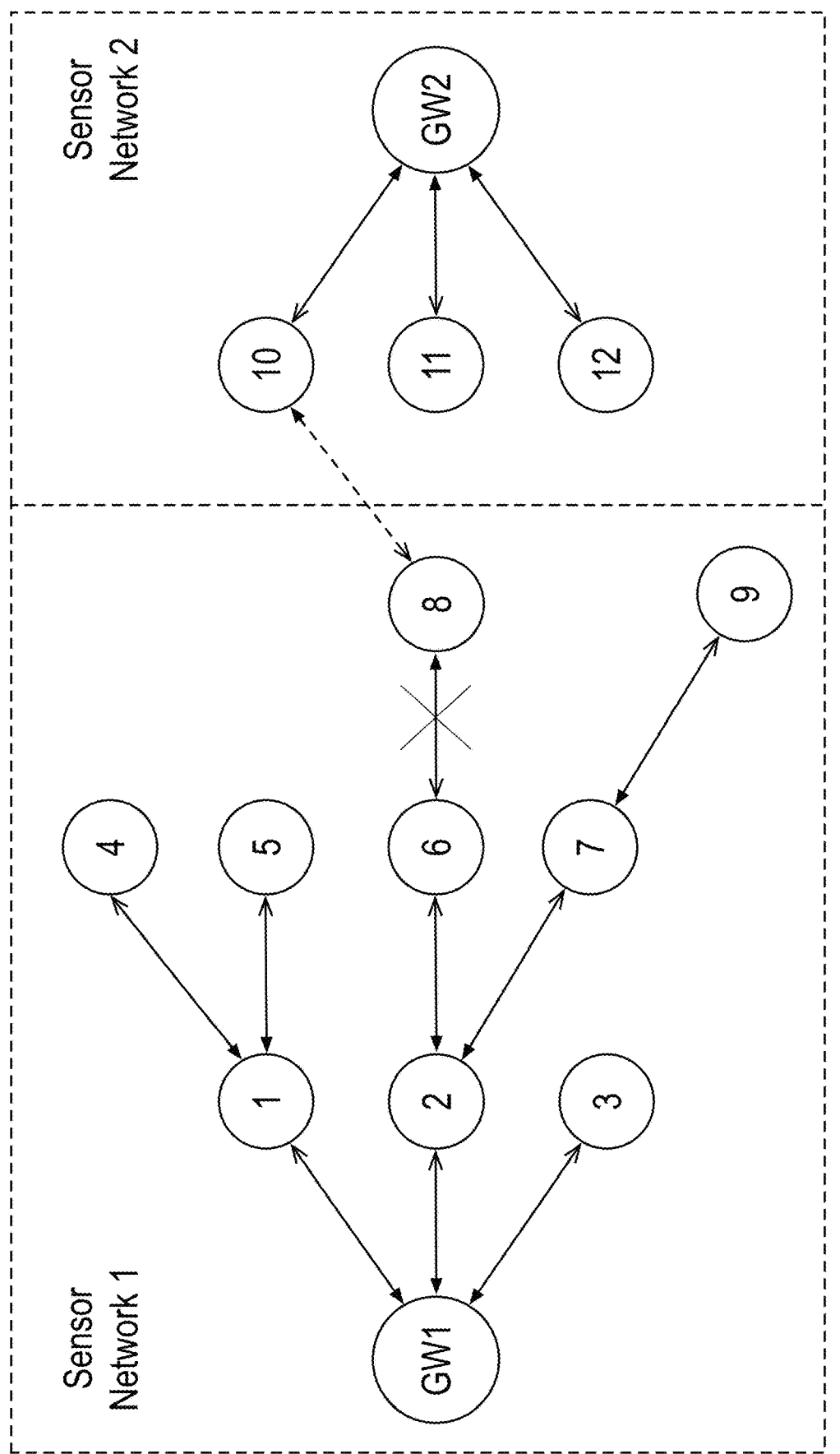
FIG. 14 illustrates an example of multiple sensor networks at a monitored location.

One of the issues of maintaining connectivity amongst the nodes relates to the operation of multiple sensor networks in or around the monitored location. FIG. 14 illustrates an example of such a scenario. As illustrated, Sensor Network 1 is facilitated by GW1. Nodes 1-9 are connected to GW1 in a manner similar to that described in FIGS. 9 and 12. Sensor Network 2 is facilitated by GW2. As illustrated, GW2 is wirelessly connected to nodes 10, 11 and 12. In various embodiments, GW1 and GW2 can share a network connection or have separate network connections to the host system.

Two sensor networks can operate in or around a particular monitored location for a variety of reasons. In general, the wireless connectivity afforded by the nodes enables great flexibility in installing new sensors at a monitored location and for extending the reach of a given sensor network. A key benefit of wireless nodes is the removal of the limitations to the sensor network boundaries based on existing network cables and/or the cost of installing new network cables.

In one scenario, multiple gateways can be installed at a monitored location to ensure that each node has a reliable communication path to at least one gateway. This can be the case, for example, where one or more nodes at a monitored location would be reliant on a single, relatively weak connection between two nodes to gain access to a single gateway. In another scenario, multiple gateways can be installed at a monitored location to effect a customer-specified segmentation of nodes. This can be the case, for example, where a first group of nodes is established as part of a first sensor network, while a second group of nodes is established as part of a second sensor network. As would be appreciated, multiple gateways can be used to effect various sensor network implementation objectives.

Regardless of the particular reason behind the usage of multiple gateways, it is recognized that the maintenance of the sensor networks at the monitored location can relate to the organization of nodes between multiple sensor networks operating in or around the monitored location. To illustrate an example maintenance scenario, consider the operation of node 8 in the example of FIG. 14. As noted above, node 8 can be initially configured to operate as part of Sensor Network 1 supported by GW1. The connection between node 8 and GW1 is facilitated by nodes 2 and 6, which are operative to relay the bi-directional traffic between node 8 and GW1.

Assume that administrative personnel determine at a later point in time that node 8 should not continue to connect to Sensor Network 1, but rather should connect to Sensor Network 2. This determination can be based on a variety of customer-specific reasons. In one example, administrative personnel may determine that the wireless connection between node 8 and node 6 is inconsistent due to varying levels of interference. In another example, administrative personnel may determine that node 8 should move to Sensor Network 2, which has been newly installed and has a relatively low number of nodes communicating with GW2. Regardless of the reason behind the determination, the administrative personnel desires to effect a change such that node 8 no longer operates as a part of Sensor Network 1 (e.g., ending the connection between node 6 and node 8) and begins to operate as part of Sensor Network 2 (e.g., establishing a connection with node 10).

Figure 15:
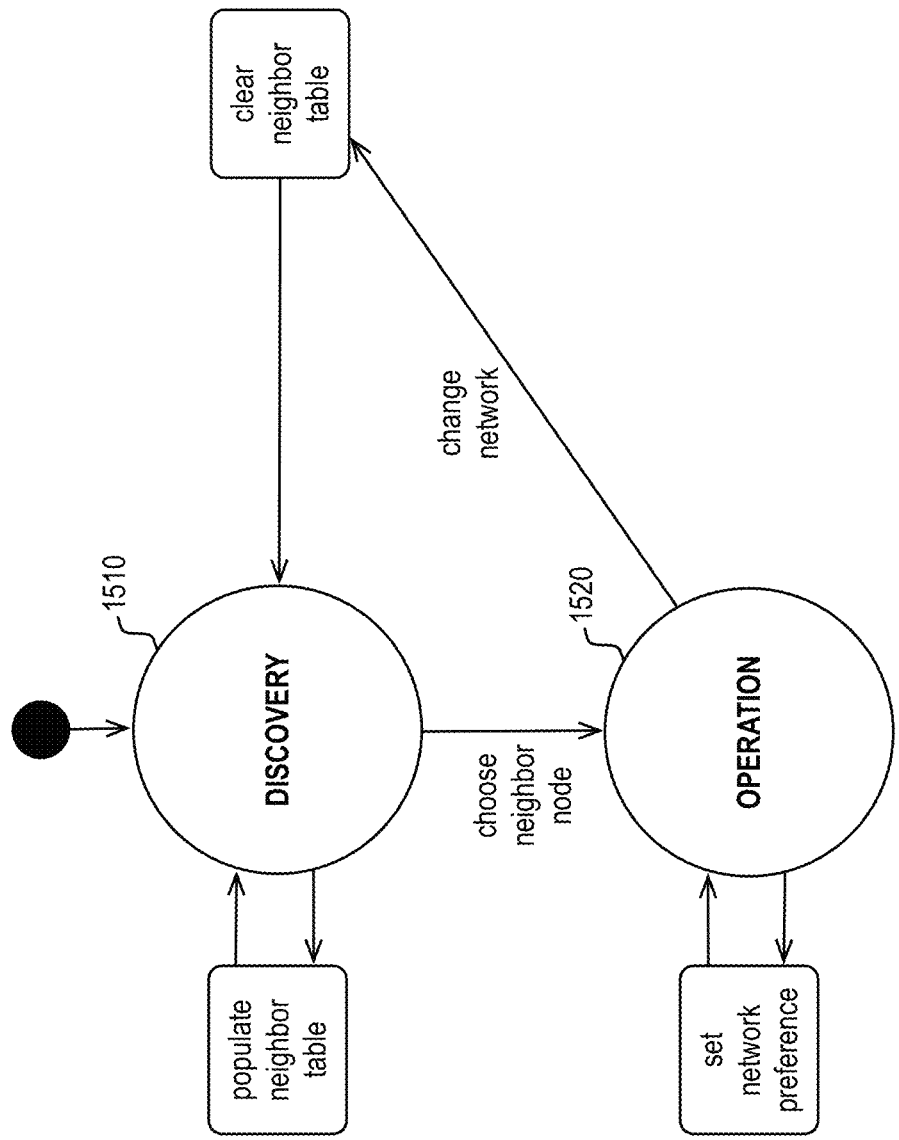
FIG. 15 illustrates an example state diagram of a selection of a sensor network by a node.

The remotely-initiated transfer of node 8 from Sensor Network 1 to Sensor Network 2 can be effected using a configuration update packet that is delivered to node 8 via node 6. The configuration update packet can include configuration update information that can be used to update configuration settings of node 8. FIG. 15 illustrates an example state diagram of an operation of a node that processes such a configuration update packet.

This high-level state diagram illustrates the functionality that enables a node to connect to a sensor network and to switch to another sensor network based on a remotely-initiated request. In a manner similar to FIG. 10, the high-level state diagram includes discovery state 1510 and operation state 1520. In general, discovery state 1510 can represent the state during which the node discovers neighbor nodes and identifies a particular discovered neighbor node for connection to the sensor network, and operation state 1520 can represent the state during which the node can collect and forward sensor data to the gateway after connection to a sensor network.

Upon power up, a newly installed node would enter discovery state 1510 to discover the existence of nodes operating near the location at which the node was installed. In one embodiment, discovery state 1510 functions to populate a neighbor table that includes a set of discovered neighbor nodes usable by the node in communicating with a gateway at the monitored location. An example discovery process implemented during discovery state 1510 was described above with respect to FIG. 11. The result of the discovery process is a choice of a neighbor node, which enables the node to enter operation state 1520.

During operation state 1520, the chosen neighbor node would facilitate bi-directional communication between the node and a particular sensor network. In the example illustration of FIG. 14, such a process can be reflected by node 8 choosing neighbor node 6 when joining Sensor Network 1. As noted above, the bi-directional communication can include upstream communication for the transmission of data packets that include sensor data collected by the node device and/or one or more attached bridge units and for the transmission of status packets that include status information reflecting the current state of operation and configuration of the node and/or one or more attached bridge units. In one embodiment, the status packets can include status information that reflects the sensor network that the node is communicating with and the relative positioning of the node (e.g., neighbor node ID and distance to the gateway) within the topology of that particular sensor network.

Based on the receipt of status packets from the various nodes at a monitored location, the host system can construct a view of the current topology of the various sensor networks operating in or around the monitored location. The construction of the view of the current topology enables an analysis of the effectiveness of the operation of the various sensor networks. In one example, such an analysis can lead to a determination of a need to reorganize the connectivity of one or more nodes between the various sensor networks operating in or around the monitored location. In the example illustrated in FIG. 14, such an analysis could lead to a determination that node 8 should be moved from its current connection to Sensor Network 1 to a new connection with Sensor Network 2.

In the present disclosure it is recognized that such a reorganization of nodes with sensor networks can be effected remotely. As noted above, the bi-directional communication facilitated by a neighbor node can include downstream communication for the transmission of configuration update packets that include configuration update information. In one embodiment, the configuration update information can include sensor network preference information that can be used to change the connectivity of the node amongst the various sensor networks that are operating in or around the monitored location.

To illustrate this process, reference is made to the example illustrated in FIG. 14. During operation state 1520, node 8 is wirelessly connected to node 6 in Sensor Network 1. The bi-directional communication facilitated by node 6 would enable node 8 to transmit data packets and status packets to GW1 for delivery to the host system. At some point in time during operation of node 8 in operation state 1520, the host system can choose to change the sensor network connectivity of node 8. The host system can then transmit a configuration setup request to GW1. A configuration update packet based on the configuration setup request can then be transmitted by GW1 for delivery to node 8 via nodes 2 and 6.

In an example directed to a sensor network based on IEEE 802.15.4, the configuration update packet can include configuration update information that specifies the PAN ID of a particular sensor network that the host system desires the node to join. In one embodiment, the configuration update information can also include a sensor network preference parameter that instructs the node to remain with that particular sensor network. In other words, the sensor network preference parameter can restrict the node to only using the particular sensor network specified by the configuration update information.

The configuration update information contained in the configuration update packet can be used to effect a change in the node's configuration settings. In particular, the node can set network preference parameters (e.g., PAN ID) that can define how the node communicates with the various sensor networks in the future.

In one scenario, the network preference parameters can establish that the node is restricted to using the current sensor network with which the node is currently communicating. For example, node 8 can receive a configuration update packet from GW1 via nodes 2 and 6 that specifies that node 8 is restricted to using Sensor Network 1. In that case, node 8 can continue to use node 6 as its neighbor node and continue in operation state 1520. Node 8 would be prohibited, however, from establishing a future connection to a neighbor node in Sensor Network 2.

In another scenario, the network preference parameters can establish that the node is instructed to using a sensor network different from the one with which the node is currently communicating. For example, node 8 can receive a configuration update packet from GW1 via nodes 2 and 6 that specifies that node 8 is restricted to using Sensor Network 2. In that case, node 8 would proceed to clear its neighbor table, then reenter discovery state 1510. From that point, node 8 would be prohibited from establishing a connection to a neighbor node in Sensor Network 1. Thus, during discovery state 1510, node 8 would proceed to populate its neighbor table only with neighbor nodes from Sensor Network 2. In one embodiment, node 8 can restrict its broadcast of the discovery packet to the PAN ID specified in the configuration update packet. This would ensure that only nodes in Sensor Network 2 would respond with answer packets for analysis by the node. Node 8 would then choose the best neighbor node from Sensor Network 2 for use in operation state 1520.

Figure 16:
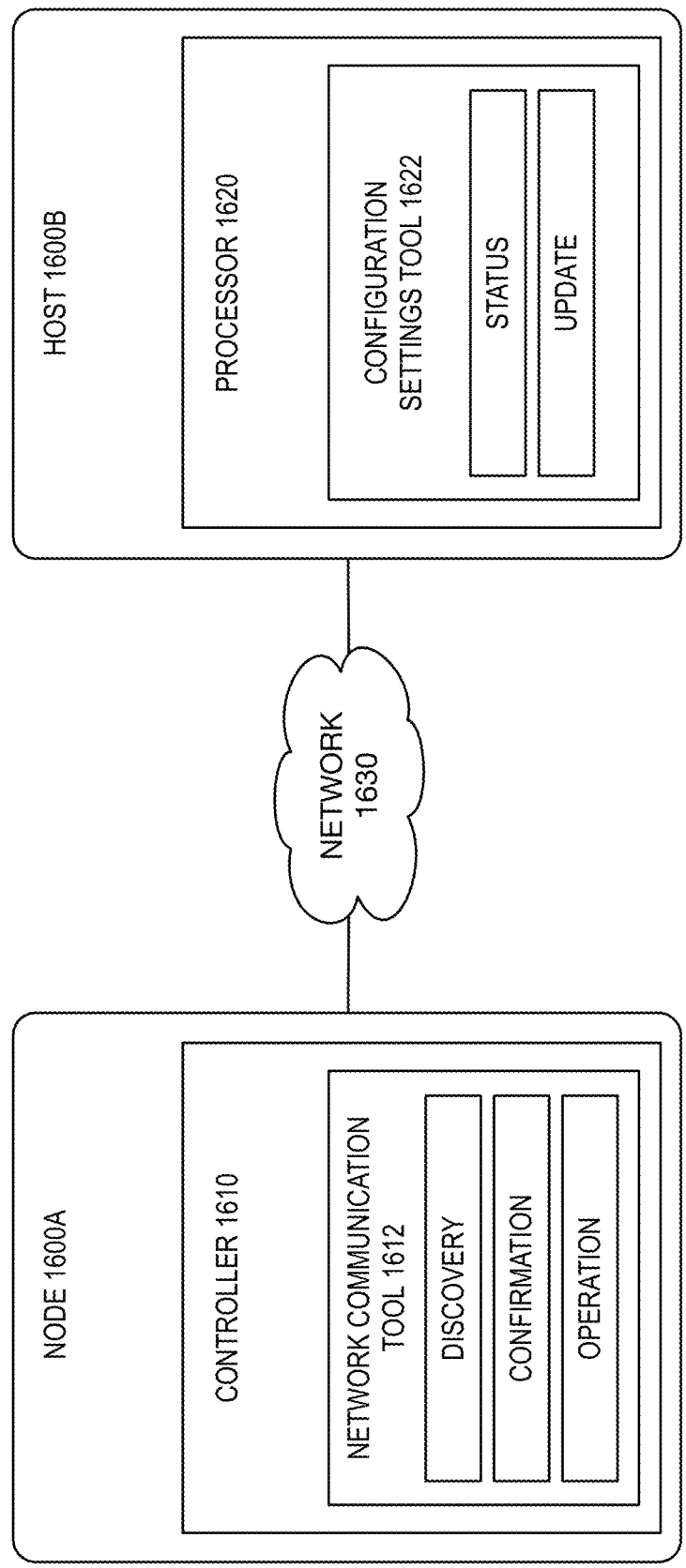
FIG. 16 illustrates a block diagram depicting a node operatively coupled to a host device according to an embodiment.

As has been described, the connection and administration of nodes in the context of one or more sensor networks can be managed through an interaction between a node and a remote host system. FIG. 16 is a block diagram depicting a node 1600A operatively coupled to a host device 1600B via a network 1630. As illustrated in FIG. 16, node 1600A includes controller 1610, which can be configured to execute a network communication tool 1612. The network communication tool 1612 can include software code sections (stored in memory or implemented in hardware such as controller 1610) that can include instructions to cause controller 1610 to manage network communications by the node with various sensor networks operating in or around a monitored location.

The network communication tool 1612 includes a discovery section, a confirmation section, and an operation section. The discovery section can be configured to broadcast discovery packets, evaluate responses to the discovery packets and choose the best neighbor node for communication based on the evaluation. In one embodiment, discovery section can also be configured to populate a neighbor table that includes a set of discovered neighbor nodes usable by the node in facilitating communication with a gateway at the monitored location. The confirmation section can be configured to confirm previously discovered neighbor node(s) in the sensor network. As part of this process, the confirmation section can be configured to send a confirmation packet to each previously discovered node, review the answer packets, and then determine whether a change in the sensor network is indicated. Where a change in the sensor network is not indicated, then the previously discovered nodes are confirmed for use in establishing bi-directional communication with the sensor network. Where a change in the sensor network is indicated, then a new discovery process can be initiated to discover a new set of neighbor nodes for use in establishing bi-directional communication with the sensor network. Finally, operation section can be configured to enable the process of collecting and forwarding sensor data to the gateway after connection to a sensor network, and to enable the process of managing a configuration of the node device and/or one or more attached bridge units.

As illustrated in FIG. 16, host device 1600B includes processor 1620 configured to execute a configuration settings tool 1622. The configuration settings tool 1622 can include software code sections (stored in memory or implemented in hardware such as processor 1620) that can include instructions to cause processor 1620 to manage the configuration of nodes in the sensor network.

As illustrated, the configuration settings tool 1622 includes a status section and an update section. The status section can be configured to enable the receipt of a status packet from a gateway device at a monitored location, and to extract, from the received packet, information reflective of a current configuration of a node operating in a sensor network at the monitored location. The configuration update section can be configured to compare the current configuration of the node to the configuration settings stored in the database of the host system. When the comparison indicates that the current configuration of the node does not match the stored configuration settings, then the configuration update section can be configured to transmit a configuration update packet to the gateway device to effect a change of the current configuration of the node and/or one or more attached bridge units. In one embodiment, the configuration update packet can include personal area network configuration information that enables the node to select one of a plurality of sensor networks as a preferred sensor network for use by the node.

Another embodiment of the present disclosure can provide a machine and/or computer readable storage and/or medium, having stored thereon, a machine code and/or a computer program having at least one code section executable by a machine and/or a computer, thereby causing the machine and/or computer to perform the steps as described herein.

Those of skill in the relevant art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Those of skill in the relevant art can implement the described functionality in varying ways for each particular application. Various components and blocks may be arranged differently (e.g., arranged in a different order, or partitioned in a different way) all without departing from the scope of the subject technology.

These and other aspects of the present disclosure will become apparent to those skilled in the relevant art by a review of the preceding detailed disclosure. Although a number of salient features of the present disclosure have been described above, the principles in the present disclosure are capable of other embodiments and of being practiced and carried out in various ways that would be apparent to one of skill in the relevant art after reading the present disclosure, therefore the above disclosure should not be considered to be exclusive of these other embodiments. Also, it is to be understood that the phraseology and terminology employed herein are for the purposes of description and should not be regarded as limiting.

What is claimed is:

1. A method, comprising:
   receiving, by a host system, a status packet from a wireless node via a first sensor network, the first sensor network identified by the wireless node during a discovery state, wherein the first sensor network includes a first gateway device that forms a first wireless network with a first plurality of wireless nodes;
   determining, by the host system, one of a plurality of sensor networks as an assigned sensor network for the wireless node, the plurality of sensor networks including the first sensor network and a second sensor network, the second sensor network including a second gateway device that forms a second wireless network with a second plurality of wireless nodes; and
   transmitting, by the host system, a configuration update packet for delivery to the wireless node via the first sensor network, the configuration update packet including sensor network configuration information usable by the wireless node, which restricts the wireless node to communication with the assigned sensor network.

2. The method of claim 1, wherein the assigned sensor network is the first sensor network.

3. The method of claim 1, wherein the assigned sensor network is the second sensor network.

4. The method of claim 1, wherein the sensor network configuration information includes a sensor network identifier of the assigned sensor network.

5. The method of claim 1, wherein the transmitting comprises transmitting to the first gateway device.

6. The method of claim 1, wherein the first gateway device is installed in a building.

7. The method of claim 6, wherein the second gateway device is installed in the building.

8. The method of claim 1, wherein the determining is part of administrating the plurality of sensor networks.

9. The method of claim 1, wherein the determining is based on wireless interference in at least one of the plurality of sensor networks.

10. The method of claim 1, wherein the determining is based on a number of nodes in at least one of the plurality of sensor networks.

11. A device, comprising:
a wireless transceiver for wirelessly transmitting a status packet from the device via a first sensor network, the first sensor network identified by the device during a discovery state, wherein the first sensor network includes a first gateway device that forms a first wireless network with a first plurality of wireless nodes; and
a controller that determines, based on a configuration update packet received by the wireless transceiver via the first sensor network, an assigned sensor network from a plurality of sensor networks for the device, the plurality of sensor networks including the first sensor network and a second sensor network, the second sensor network having a second gateway device that forms a second wireless network with a second plurality of wireless nodes, the controller configured to restrict the device to communication with the assigned sensor network.

12. The device of claim 11, wherein the assigned sensor network is the first sensor network.

13. The device of claim 11, wherein the assigned sensor network is the second sensor network.

14. The device of claim 11, wherein the configuration update packet includes a sensor network identifier of the assigned sensor network.

15. The device of claim 11, wherein the first gateway device is installed in a building.

16. The device of claim 15, wherein the second gateway device is installed in the building.

17. The device of claim 11, wherein the assigned sensor network is based on wireless interference in at least one of the plurality of sensor networks.

18. The device of claim 11, wherein the assigned sensor network is based on a number of nodes in at least one of the plurality of sensor networks.

19. The device of claim 11, wherein the wireless transceiver communicates using the IEEE 802.15.4 protocol.

20. The device of claim 11, wherein the configuration update packet is determined base on processing by one or more servers in an operation center remote from a building in which the device is installed.

* * * * *